US012641646B2

(12) United States Patent
Lu et al.

(10) Patent No.: US 12,641,646 B2
(45) Date of Patent: May 26, 2026

(54) METHODS AND DEVICES FOR RESTRICTED TARGET WAKE TIME OPERATION FOR LATENCY SENSITIVE TRAFFIC IN WIRELESS LOCAL AREA NETWORKS

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG); Chaoming Luo, Dogguan (CN); Pei Zhou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 317 days.

(21) Appl. No.: 18/456,751

(22) Filed: Aug. 28, 2023

(65) Prior Publication Data

US 2023/0413331 A1 Dec. 21, 2023

Related U.S. Application Data

(63) Continuation of application No. PCT/CN2021/089431, filed on Apr. 23, 2021.

(51) Int. Cl.
*H04W 74/0816* (2024.01)
*H04W 74/08* (2024.01)
*H04W 84/12* (2009.01)

(52) U.S. Cl.
CPC ....... *H04W 74/0816* (2013.01); *H04W 74/08* (2013.01); *H04W 84/12* (2013.01)

(58) Field of Classification Search
CPC .. H04W 74/0816; H04W 74/08; H04W 84/12
(Continued)

(56) References Cited

U.S. PATENT DOCUMENTS

2017/0127404 A1 5/2017 Merlin et al.
2020/0137612 A1 4/2020 Li et al.
(Continued)

FOREIGN PATENT DOCUMENTS

CN 108141325 A 6/2018
CN 109156024 A 1/2019
(Continued)

OTHER PUBLICATIONS

International Search Report and Written Opinion from the China National Intellectual Property Administration for International Application No. PCT/CN2021/089431 mailed Jan. 12, 2022 (7 pages).
(Continued)

*Primary Examiner* — Intekhaab A Siddiquee
(74) *Attorney, Agent, or Firm* — BAYES PLLC

(57) ABSTRACT

Embodiments of the invention provide methods and devices for restricted target awake time (R-TWT) operation for latency sensitive traffic in a WLAN. The method carried out by an Access Point (AP) in an AP MLD comprises: sending a first response to a first station (STA) in a non-AP MLD the first STA to map at least one Traffic Identifier (TID) for latency sensitive traffic to at least one link set up between the AP MLD and the non-AP MLD, wherein the AP MLD comprises a plurality of APs and the non-AP MLD comprises a plurality of non-AP STAs, and sending a R-TWT response to the first STA to set up R-TWT agreement on any one or more of the at least one link to which the at least one TID for latency sensitive traffic has been mapped.

20 Claims, 16 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0221545 A1 | 7/2020 | Stacey et al. | |
| 2022/0022087 A1* | 1/2022 | Chu | H04W 28/0268 |
| 2022/0132419 A1* | 4/2022 | Kwon | H04W 48/12 |

FOREIGN PATENT DOCUMENTS

| | | |
|---|---|---|
| CN | 110199494 A | 9/2019 |
| CN | 112449376 A | 3/2021 |
| EP | 4228370 A1 | 8/2023 |
| EP | 4231554 A1 | 8/2023 |
| WO | 2020040587 A1 | 2/2020 |
| WO | WO 2021/02617 A1 | 1/2021 |

OTHER PUBLICATIONS

Chunyu Hu et al., IEEE P802.11-21/462 Wireless LANs; Restricted TWT Spec Text; Resolving TBDs: Part I, Mar. 2021 (6 pages).
Chunyu Hu et al., IEEE 802.11-20/1046r14, Protected TWT Enhancement for Latency Sensitive Traffic, Aug. 2020 (22 pages).
Yongho Seok et al., IEEE P802.11 Wireless LANs; Proposed Draft Text for MLO TID-to-link Mapping, Mar. 2021 (10 pages).
Ming Gan et al., IEEE P802.11 Wireless LANs; Proposed Draft Text for TWT for MLD, Jan. 2021 (6 pages).
Chunyu Hu et al., IEEE P802.11-20/1395r0 Wireless LANs; Proposed Draft Text for TWT for MLD, Jan. 2021 (4 pages).
Extended European Search Report issued in corresponding European application No. 21937381.8, mailed Feb. 15, 2024.
"35. Extremely high throughput (EHT) MAC specification 35.1 Introduction", IEEE Draft; TGBE_CL_35, IEEE-SA, Piscataway, NJ USA, vol. 802.11be drafts, No. D0.4 Apr. 5, 2021 (Apr. 5, 2021), pp. 1-54, XP068178618.
Duncan Ho (Qualcomm): "Low Latency Enhancements for R1", IEEE Draft; 11-20-0163-01-00BE-Low-Latency-Enhancements, IEEE-SA Mentor, Piscataway, NJ USA, vol. 802.11 EHT; 802.11be, No. 1 Aug. 27, 2020 (Aug. 27, 2020), pp. 1-11, XP068172327.
Liwen Chu (NXP): "Low Latency Support", IEEE Draft; 11-20-1058-01-00BE-LOW-LATENCY-SUPPORT, IEEE-SA Mentor, Piscataway, NJ USA, vol. 802.11 EHT; 802.11be, No. 1 Oct. 14, 2020 (Oct. 14, 2020), pp. 1-10, XP068173794.
Protected TWT Enhancement for Latency Sensitive Traffic, Aug. 2020 IEEE 802.11-20/1046r13, Jul. 29, 2020, 22 pages.
Proposed Draft Text for TWT for MLD, Wireless LANs, Jan. 2021, doc.: IEEE 802.11-21/0080r3, Jan. 4, 2021, 3 pages.
Comment Resolution for 11beD0.3 EHT STA Features CIDs, Wireless LANs, Feb. 2021, doc.:IEEE 802.11-21/0299r0, Feb. 22, 2021, 6 pages.
Multi-link TIM follow-up, Jan. 2021, doc.: IEEE 802.11-21/0179r0, Jan. 19, 2021, 12 pages.
Proposed Draft Specification for leftover TBDs, Wireless LANs, Apr. 2021, doc.: IEEE 802.11-21/0572r0, Apr. 2, 2021, 19 pages.
Resolutions for CC34 CIDs for More Data usage, Wireless LANs, Mar. 2021 doc.: IEEE 802.11-20/480r0, Feb. 8, 2021, 9 pages.
Comment resolutions for TWT power save, Wireless LANs, Mar. 2019 doc.: IEEE 802.11-19/0315r1, Mar. 1, 2019, 5 pages.
MLO: Broadcast TWT for MLDs, Mar. 2021, doc.: IEEE 802.11-21/0394r0, Mar. 5, 2021, 10 pages.
Notification of Granting a Patent Right issued in corresponding Chinese Application No. 202311873381.X, mailed on Sep. 22, 2025, 12 pages.
Notice of Priority Examination of Patent Application issued in corresponding Chinese Application No. 202311873381.X, mailed on Sep. 2, 2025, 12 pages.
CR for Low-Latency stream identification, Date: Jan. 21, 2022, doc.: IEEE 802.11-21/1686r3, Oct. 2021, 13 pages.

\* cited by examiner

| Request Type | Target Wake Time | Nominal Minimum TWT Wake Duration | TWT Wake Interval Mantissa | Broadcast TWT Info | LINK ID Bitmap | Link Mapping Of TID i for downlink direction | Link Mapping Of TID i for uplink direction |
|---|---|---|---|---|---|---|---|
| | | | | | | | |

Figure 7A

METHODS AND DEVICES FOR RESTRICTED TARGET WAKE TIME OPERATION FOR LATENCY SENSITIVE TRAFFIC IN WIRELESS LOCAL AREA NETWORKS

CROSS-REFERENCE TO RELATED APPLICATION

This application is a continuation application of PCT Patent Application No. PCT/CN2021/089431, entitled "METHODS AND DEVICES FOR RESTRICTED TARGET WAKE TIME OPERATION FOR LATENCY SENSITIVE TRAFFIC IN WIRELESS LOCAL AREA NETWORKS," filed on Apr. 23, 2021, the entire content of which is incorporated herein by reference.

TECHNICAL FIELD

The invention relates to target wake time (TWT) mechanism in wireless communications, and more particularly to methods and devices for restricted TWT (R-TWT) operation for latency sensitive traffic in a wireless local area network (WLAN).

BACKGROUND

TWT mechanism was initially designed to manage activities in the basic service set (BSS) by scheduling stations (STAs) to reduce wake time of STAs required for power management. Institute of Electrical and Electronics Engineers (IEEE) 802.11 be introduces the R-TWT operation which provides more predictable latency with higher reliability for latency sensitive traffic based on the TWT mechanism. Typically, the R-TWT mechanism is used for a protected transmission of latency sensitive traffic. Each latency sensitive traffic has a corresponding traffic identifier (TID).

Furthermore, 802.11be also defines a directional-based TID-to-link mapping mechanism among multiple links set up between an access point (AP) multi-link device (MLD) including a plurality of APs, and a non-AP MLD including a plurality of non-AP STAs. After the multiple links between the AP MLD and non-AP MLD are successfully set up, the TID-to-link mapping may be updated through a negotiation between the AP MLD and the non-AP MLD when necessary.

SUMMARY

Embodiments of the invention provide methods and devices for R-TWT operation for latency sensitive traffic in a WLAN.

According to a first aspect of the invention, various embodiments of the invention provide a first method for R-TWT operation for latency sensitive traffic in a WLAN performed at an AP side. The method may comprise: sending, a first AP in an AP MLD, a first response to a first STA in a non-AP MLD to map at least one TID for latency sensitive traffic to at least one link set up between the AP MLD and the non-AP MLD, wherein the AP MLD comprises a plurality of APs and the non-AP MLD comprises a plurality of non-AP STAs, and sending, by the first AP, a R-TWT response to the first STA to set up R-TWT agreement on any one or more of the at least one link to which the at least one TID for latency sensitive traffic has been mapped.

According to a second aspect of the invention, various embodiments of the invention provide a second method for R-TWT operation for latency sensitive traffic in a WLAN performed at an STA. The method may comprise: receiving, by a first STA in a non-AP MLD, by the first STA, a first response from a first AP in an AP MLD to map at least one TID for latency sensitive traffic to at least one link set up between the AP MLD and the non-AP MLD, wherein the AP MLD comprises a plurality of APs and the non-AP MLD comprises a plurality of non-AP STAs; receiving, by the first STA, a R-TWT response to set up R-TWT agreement on any one or more of the at least one link to which the at least one TID for latency sensitive traffic has been mapped.

According to a third aspect of the invention, various embodiments of the invention provide an AP for R-TWT operation for latency sensitive traffic in a WLAN. The AP may comprise: a TID-to-Link mapping unit configured to send a first response to a first STA in a non-AP MLD to map at least one TID for latency sensitive traffic to at least one link set up between an AP MLD and the non-AP MLD, wherein the AP MLD comprises a plurality of APs including the AP, and the non-AP MLD comprises a plurality of non-AP STAs including the first STA; and a R-TWT setup unit configured to send a R-TWT response to the first STA to set up R-TWT agreement on any one or more of the at least one link to which the at least one TID for latency sensitive traffic has been mapped.

According to a fourth aspect of the invention, various embodiments of the invention provide an STA for R-TWT operation for latency sensitive traffic in a WLAN. The STA may comprise: a TID-to-Link mapping request unit configured to receive a first response from a first AP in an AP MLD to map at least one TID for latency sensitive traffic to at least one link set up between the AP MLD and a non-AP MLD, wherein the AP MLD comprises a plurality of APs including the first AP and the non-AP MLD comprises a plurality of non-AP STAs including the STA; and an R-TWT request unit configured to receive a R-TWT response from the first AP to set up R-TWT agreement on any one or more of the at least one link to which the at least one TID for latency sensitive traffic has been mapped.

According to a fifth aspect of the invention, various embodiments of the invention provide an AP for R-TWT operation for latency sensitive traffic in a WLAN. The AP may comprise a memory to store instructions for performing the first method for R-TWT operation for latency sensitive traffic in the WLAN, and a processor communicably coupled with the memory, the processor configured to execute the instructions to perform the first method for R-TWT operation for latency sensitive traffic in a WLAN as described in various embodiments of the invention.

According to a sixth aspect of the invention, various embodiments of the invention provide an STA for R-TWT operation for latency sensitive traffic in a WLAN. The STA may comprise a memory to store instructions for performing the second method for R-TWT operation for latency sensitive traffic in the WLAN, and a processor communicably coupled with the memory, the processor configured to execute the instructions to perform the second method for R-TWT operation for latency sensitive traffic in a WLAN as described in various embodiments of the invention.

According to a seventh aspect of the invention, various embodiments of the invention provide a computer program product. The computer program product comprises instructions to cause a computer to perform the first or the second method for R-TWT operation for latency sensitive traffic in a WLAN according to any embodiment of the invention, when executed thereon.

According to an eighth aspect of the invention, various embodiments of the invention provide a computer program comprising instructions to cause a computer to perform a method for R-TWT operation for latency sensitive traffic in a WLAN according to any embodiment of the invention, when executed thereon.

According to a ninth aspect of the invention, various embodiments of the invention provide a chip configured to perform a method for R-TWT operation for latency sensitive traffic in a WLAN according to any embodiment of the invention.

BRIEF DESCRIPTION OF THE DRAWINGS

The invention will be described in detail with reference to the accompanying drawings, in which:

FIG. 7A is a block diagram illustrating a first format of a Broadcast R-TWT Parameter Set field of an R-TWT element with TID-to-Link mapping information according to some embodiments of the invention.

DETAILED DESCRIPTION

Figure 1:
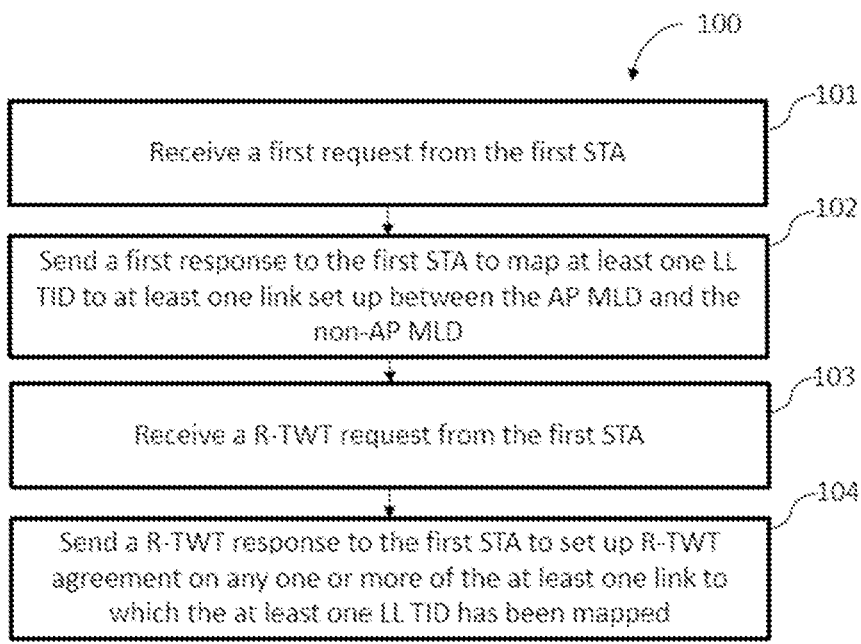
FIG. 1 is a flowchart illustrating a first method for R-TWT operation for latency sensitive traffic in a WLAN carried out by a first AP according to various embodiments of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only and is not intended to limit the scope of the invention.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels and are not intended to impose numerical requirements on their objects. As used herein, the term "configured to" is interchangeable with "operative" or "adapted to".

The existing 802.11be has not defined a mechanism for the R-TWT operation in collaboration with the TID-to-link mapping. This may cause inconsistencies between the R-TWT Operation and a scenario formed by the TID-to-link mapping.

It would therefore be desirable to provide an effective mechanism for collaboration of the R-TWT operation for latency sensitive traffic and the TID-to-Link mapping in a WLAN, especially in IEEE 802.11be EHT WLAN.

Various embodiments of the invention provide a mechanism for coordinating R-TWT agreement setup process and R-TWT operation with TID-to-Link mapping in a WLAN. The R-TWT operation is provided to allow an AP to use enhanced medium access protection and resource reservation mechanisms to provide more predictable latency and reduce worst case latency and/or jitter so that the AP has higher reliability for latency sensitive traffic. The TID-to-Link mapping is a directional-based TID-to-Link mapping mechanism among a plurality of links set up between an AP MLD which includes a plurality of APs and a non-AP MLD which includes a plurality of non-AP STAs. Each TID is used by higher layer entities to distinguish medium access control (MAC) service data units (MSDUs) to MAC entities that support quality of service (QoS) within the MAC data service.

Embodiments of the invention provide methods and devices for R-TWT operation for latency sensitive traffic in a WLAN. With the methods and devices proposed in various embodiments of the invention, the R-TWT operation may effectively cooperate with the TID-to-Link mapping to avoid any possible inconsistent scenarios.

FIG. 1 is a flowchart illustrating a first method 100 for R-TWT operation for latency sensitive traffic in a WLAN carried out by a first AP according to various embodiments of the invention. The first AP is an AP in an AP MLD which includes a plurality of APs, and a link may be set up between the first AP and a first non-AP STA in a non-AP MLD which includes a plurality of non-AP STAs.

At Block 101, a first request from the first STA is received by the first AP.

At Block 102, a first response is sent by the first AP to the first STA to map at least one TID for latency sensitive traffic to at least one link set up between the AP MLD and a non-AP MLD, wherein the AP MLD comprises a plurality of APs and the non-AP MLD comprises a plurality of non-AP STAs.

In embodiments of the invention, the TID for latency sensitive traffic is also referred to as LL TID.

At Block 103, a R-TWT request from the first STA is received by the first AP.

At Block 104, a R-TWT response is sent to the first STA by the first AP to set up R-TWT agreement on any one or more of the at least one link to which the at least one LL TID has been mapped.

Although in the first method 100, the first AP sends first response upon receipt of the first request from the first STA, it should be noted that in some embodiments, the first AP may send an unsolicited first response without receiving the first request to map at least one TID for latency sensitive traffic to at least one link set up between the AP MLD and a non-AP MLD. Further, in the first method 100, the R-TWT agreement is set up by the two steps in block 103 and block 104. However, it should be note that in other embodiments, the R-TWT agreement on any one or more of the at least one link to which the at least one LL TID has been mapped may be set up by an unsolicited R-TWT response from the first AP to the first STA. That is to say, the first AP may not receive the R-TWT request from the first STA and only send an unsolicited R-TWT response to the first STA to set up R-TWT agreement on any one or more of the at least one link to which the at least one LL TID has been mapped.

Figure 2:
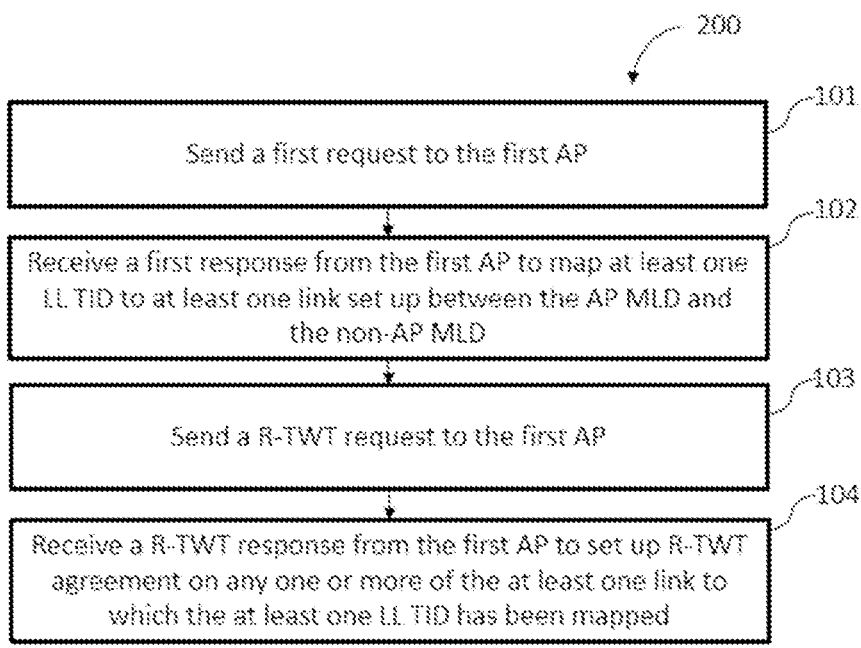
FIG. 2 is a flowchart illustrating a second method for R-TWT operation for latency sensitive traffic in a WLAN carried out by the first non-AP STA according to various embodiments of the invention.

FIG. 2 is a flowchart illustrating a second method 200 for R-TWT operation for latency sensitive traffic in a WLAN carried out by the first non-AP STA according to various embodiments of the invention.

At Block 201, a first request is sent by the first STA to the first AP.

At Block 202, a first response from the first AP is received by the first STA to map at least one LL TID to at least one link set up between the AP MLD and a non-AP MLD, wherein the AP MLD comprises a plurality of APs and the non-AP MLD comprises a plurality of non-AP STAs.

At Block 203, a R-TWT request is sent by the first STA to the first AP.

At Block 204, a R-TWT response from the first AP is received by the first STA to set up R-TWT agreement on any one or more of the at least one link to which the at least one LL TID has been mapped.

Although in the second method 200, the first STA sends the first request to the first AP before receiving the first response from the first AP, it should be noted that in some embodiments, the first STA may not send the first request and only receive an unsolicited first response from the first AP to map at least one TID for latency sensitive traffic to at least one link set up between the AP MLD and a non-AP MLD. Further, in the second method 200, the R-TWT agreement is set up by the two steps in block 103 and block 104. However, it should be note that in other embodiments, the R-TWT agreement on any one or more of the at least one link to which the at least one LL TID has been mapped may be set up by an unsolicited R-TWT response from the first AP to the first STA. That is to say, the first STA may not send the R-TWT request and only receive an unsolicited R-TWT response from the first AP to set up R-TWT agreement on any one or more of the at least one link to which the at least one LL TID has been mapped.

Multi-Link Setup Process with Default TID-to-Link Mapping

In some embodiments, the TID-to-Link mapping process may be a default process which is conducted during or after a multi-link setup process between the AP MLD and the non-AP MLD. In these embodiments, the first request received by the first AP may be a first Multi-link Association request from the first STA. The first response sent by the first AP may be a first Multi-link Association response which is sent to the first STA to set up a plurality of links between the APs in the AP-MLD and the STAs in the non-AP MLD and map all TIDs to all of the plurality of links set up between the AP MLD and the non-AP MLD by default, wherein all TIDs include the at least one LL TID. In these embodiments, the R-TWT agreement may be set up on any one or more of the links set up between the AP MLD and the non-AP MLD.

Multi-Link Setup Process with TID-to-Link Mapping Negotiation

In some embodiments, the TID-to-Link mapping may be established by TID-to-Link mapping negotiation during the multi-link setup process, i.e., the negotiation may be included in the multi-link setup process. In these embodiments, the first request received by the first AP may be a second Multi-Link Association request from the first STA. The first response sent by the first AP may be a second Multi-link Association response which is sent to the first STA to set up a plurality of links between the APs in the AP-MLD and the STAs in the non-AP MLD and map at least one TID for latency sensitive traffic to a subset of the links set up between the AP-MLD and the non-AP MLD through a negotiation between the first STA and the first AP.

In these embodiments, the at least one LL TID may be mapped to a subset of the links between the AP-MLD and the non-AP MLD. Each TID may be mapped to same or different link set. In one example, the non-AP MLD may indicate during the multi-link setup process, e.g., in the second Multi-link Association request sent from the first STA to the first AP, that a same or different link set may be used for each TID. For example, the first STA may indicate in the second Multi-link Association request that a same link set is used for all TIDs, or all TIDs are mapped to all links set up between the AP MLD and the non-AP MLD.

TID-to-Link Mapping Negotiation

In some embodiments, the TID-to-Link mapping may be updated after the multi-link setup process through a negotiation between the AP MLD and the non-AP MLD, e.g., through a negotiation between the first AP and the first STA. This negotiation may be initiated by the AP MLD or the non-AP MLD according to uplink and downlink load, link state, and/or performance. The link state may include power save state. In one embodiment, the negotiation at the first AP side may include: a TID-to-Link Mapping request from the first STA is received by the first AP, and a TID-to-Link Mapping response is sent by the first AP to the first STA to map the at least one LL TID to a link between the AP-MLD and the non-AP MLD to which the at least one LL TID has not been mapped. Accordingly, the negotiation at the first STA side may include: a TID-to-Link Mapping request is sent by the first STA to the first AP, and a TID-to-Link Mapping response from the first AP is received by the first STA to map the at least one TID for latency sensitive traffic to a link between the AP-MLD and the non-AP MLD to which the at least one LL TID has not been mapped.

It should be noted that in some embodiments of the invention, the TID-to-Link Mapping negotiation for all of the links set up between the AP MLD and the non-AP MLD may be performed through this separate TID-to-Link mapping negotiation process instead of being performed together with the multi-link setup process or being a default process without the need of negotiation.

In various embodiments, the R-TWT agreement setup process, i.e., the process of setting up R-TWT agreement on any one or more of the at least one link to which the at least one LL TID has been mapped, is conducted through a negotiation between the AP MLD and the non-AP MLD, e.g., a negotiation between the first AP and the first STA. In the negotiation process, a R-TWT request from the first STA is received by the first AP; and a first R-TWT response is sent by the first AP to the first STA to set up the R-TWT agreement on any one or more of the at least one link to which the at least one LL TID has been mapped. In one example, if there are two links between the AP MLD and the non-AP MLD, Link 1 is set up between the first AP and the first STA, and Link 2 is set up between a second AP and a second STA, the negotiation between the first AP and the first STA may be conducted to set up the R-TWT agreement on Link 1, Link 2 or both. The R-TWT agreements set up on Link 1 and Link 2 may have same or different starting time, ending time and other parameters.

In some embodiments, the R-TWT request from the first STA and/or the R-TWT response from the first AP may comprise an R-TWT element including a first subfield and a second subfield in a Control field, wherein the first subfield is set to indicate whether information included in the R-TWT element is for negotiation of parameters of R-TWT, and the second subfield is set to indicate whether the information included in the R-TWT element is applied to all links to which the at least one TID for latency sensitive traffic has been mapped.

R-TWT Setup Process Integrated with TID-to-Link Mapping Negotiation

In some embodiments, the TID-to-Link mapping process and the R-TWT setup process may be conducted together by a negotiation between the AP MLD and the non-AP MLD, e.g., a negotiation between the first AP and the first STA. The negotiation at the first AP side may include: an integrated R-TWT request from the first STA is received by the first AP, and an integrated R-TWT response is sent by the first AP to the first STA to map the at least one TID for latency sensitive traffic to at least one link between the AP-MLD and the non-AP MLD to which the at least one LL TID has not been mapped and set up the R-TWT agreement on any one or more of the at least one link to which the at least one LL TID has been mapped.

Accordingly, the negotiation at the first STA side may include: the integrated R-TWT request is sent by the first STA to the first AP, and the integrated R-TWT response from the first AP is received by the first STA to map the at least one TID for latency sensitive traffic to at least one link between the AP-MLD and the non-AP MLD to which the at least one LL TID has not been mapped and set up the R-TWT agreement on any one or more of the at least one link to which the at least one LL TID has been mapped.

It should be noted that in some embodiments, all TID-to-Link mapping negotiation between the AP MLD and the non-AP MLD may be conducted through this integrated process, or this negotiation process may only be conducted to establish TID-to-Link mapping for a specific link after the TID-to-Link mapping for multiple links between the AP MLD and the non-AP MLD have been set up during the multi-link setup process.

In some embodiments, the integrated R-TWT request may include a first R-TWT element which is set to indicate both the at least one link on which the R-TWT agreement is to be set up and the at least one link to which the at least one LL TID is to be mapped. In some embodiments, the integrated R-TWT response may include a second R-TWT element which is set to indicate the one or more link on which the R-TWT agreement has been set up and the at least one link to which the at least one LL TID has been mapped. Preferably, the R-TWT element may be included both the second R-TWT request and the second R-TWT response.

In some embodiments, the integrated R-TWT request and/or the integrated R-TWT response may be set to include at least one first R-TWT element indicating the at least one link on which the R-TWT agreement is set up, e.g., the at least one link on which the R-agreement is to be set up or has been set up, and at least one TID-to-Link mapping element indicating the at least one link to which the at least one TID for latency sensitive traffic is mapped, e.g., the link to which at least one LL TID is to be mapped or has been mapped.

Alternatively, in some embodiments, the integrated R-TWT request and/or the integrated R-TWT response may be set to include at least one second R-TWT element indicating the one or more links on which the R-TWT agreement is set up and the at least one link to which the at least one TID for latency sensitive traffic is mapped. In a first example, the second R-TWT element may comprise a Broadcast R-TWT Parameter Set field which is set to include a first subfield, e.g., a Link ID Bitmap field, indicating at least one link to which the R-TWT is applied, a second subfield, e.g., a Link Mapping of a TID for downlink direction, indicating at least one link on which frames belonging to a TID for latency sensitive traffic for downlink direction are sent, and a third subfield, e.g., a Link Mapping of a TID for uplink direction, indicating at least one link on which frames belonging to a TID for latency sensitive traffic for uplink direction are sent. In a second example, the second R-TWT element may comprise a Broadcast R-TWT Parameter Set field which is set to include a R-TWT Traffic Info field, a Link ID Bitmap field and a subfield for R-TWT in a Request Type field, e.g., an R-TWT subfield which is set to indicate whether the TWT schedule specified by the corresponding Broadcast TWT parameter Set field is a R-TWT schedule. In a third example, the second R-TWT element is same as the second example except that in the third example, the Broadcast R-TWT Parameter Set field includes two Link ID Bitmap fields, e.g., a Link ID Bitmap for UL TID field and a Link ID Bitmap for DL TID field.

R-TWT Operation after R-TWT Setup Process

In some embodiments, the method may further include: if no TID for latency sensitive traffic is mapped to a first link set up between the first AP and the first STA due to TID-to-Link mapping update/change, the R-TWT agreement set up on the first link is to be torn down by the first AP and the first STA. For example, the R-TWT agreement may be torn down by a termination process which includes: the first AP sends a TID-to-Link Mapping Element with a R-TWT termination mode indication on the first link to terminate the R-TWT agreement on the first link. Accordingly, the R-TWT agreement on the first link is torn down by the first STA upon receipt of the TID-to-Link Mapping Element with a R-TWT termination mode indication sent on the first link. This termination process may be performed when the AP MLD and the non-AP MLD do not support or do not enter into a suspended R-TWT operation mode.

In some embodiments, when the AP MLD and the non-AP MLD support a suspended R-TWT operation mode, the first method 100 at the first AP may further include: if no TID for latency sensitive traffic is mapped to a first link set up between the first AP and the first STA, a R-TWT SP Quiet Element or a TID-to-Link Mapping Element with a suspended R-TWT mode indication may be sent by the first AP on the first link to enter the first link into a suspended R-TWT operation mode, or a TID-to-Link Mapping Element with a R-TWT termination mode indication may be sent by the first AP on the first link to terminate the R-TWT agreement on the first link.

Accordingly, the second method 200 at the first STA may further include: when non TID for latency sensitive traffic is mapped to a first link set up between the first AP and the first STA, a R-TWT SP Quiet Element or a TID-to-Link Mapping Element with a suspended R-TWT mode indication sent by the first AP on the first link is received by the first STA and the first link is entered into a suspended R-TWT operation mode by the first STA; or the R-TWT agreement on the first link is entered into a R-TWT termination mode by the first STA upon receipt of a TID-to-Link Mapping Element with a R-TWT termination mode indication. Preferably, the first method 100 and the second method 200 may further include: when the first link enters into a suspended R-TWT operation mode, if a time duration of the suspended R-TWT operation mode exceeds a predetermined threshold value, the R-TWT agreement on the first link may be torn down.

In some embodiments, the TID-to-Link mapping Element may include an R-TWT information field for TID which is set to indicate whether the at least one TID for latency sensitive traffic is mapped to a plurality of links set up between the AP MLD and the non-AP MLD and a state of R-TWT operation, wherein the state of R-TWT operation is set to indicate the suspended R-TWT operation mode, or the R-TWT termination mode, or a non-existent R-TWT mode.

It should be noted that the R-TWT agreement setup process in various embodiments of the invention may further include establishing membership in a broadcast TWT for a non-AP STA in a non-AP MLD after R-TWT agreement has been set up between the non-AP MLD and an AP MLD. Some embodiments of the invention will be described below to illustrate the method for R-TWT operation for latency sensitive traffic in a WLAN according to various embodiments of the invention. It should be noted that these embodiments are provided for illustrative purposes only, not to limit the scope of the invention.

First Embodiment (Multi-Link Set Up with Default TID-to-Link Mapping)

Figure 3A:
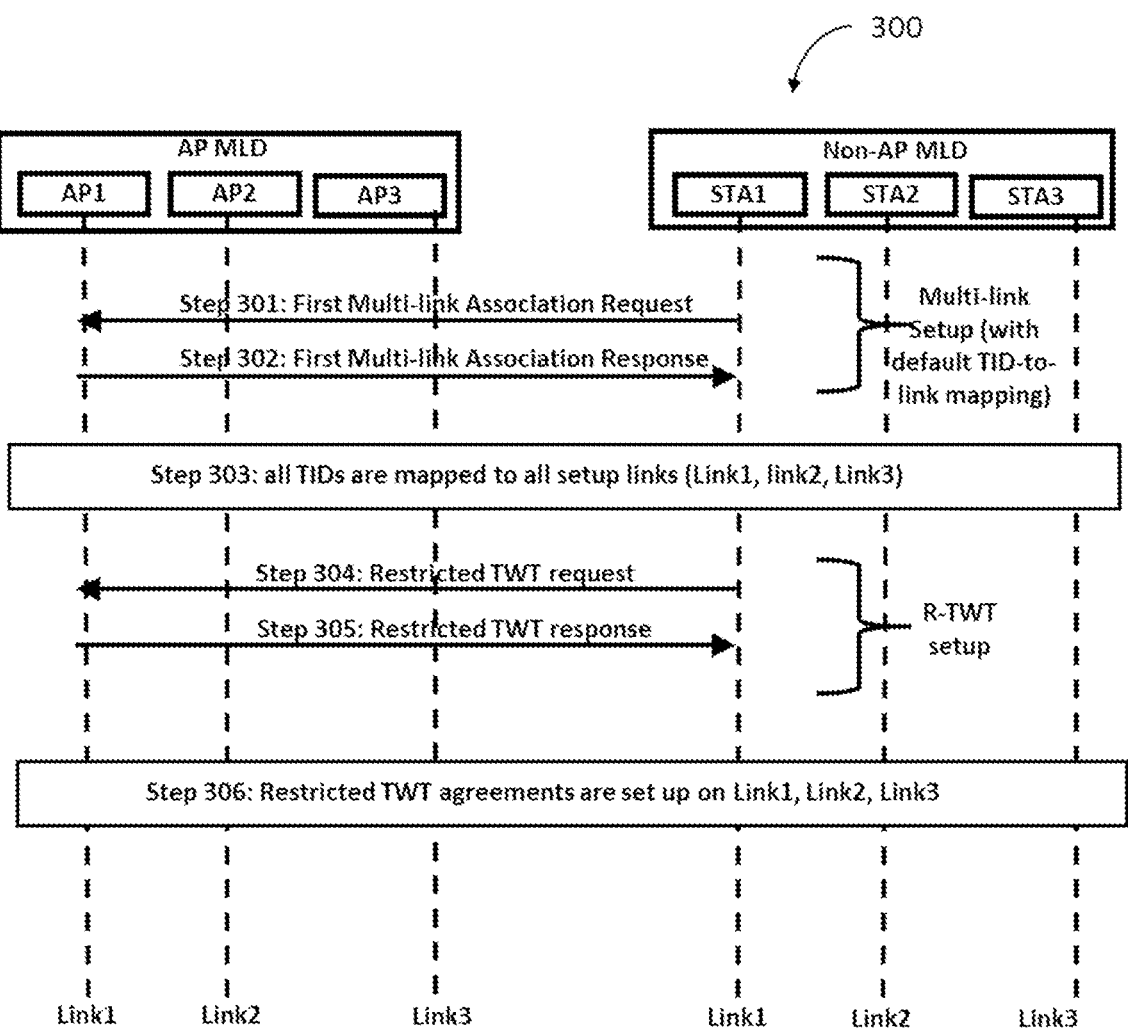
FIG. 3A is a schematic diagram illustrating a method for R-TWT operation for latency sensitive traffic in a WLAN according to a first embodiment of the invention.

FIG. 3A is a schematic diagram illustrating a method 300 for R-TWT operation for latency sensitive traffic in a WLAN according to a first embodiment of the invention. In this embodiment, the AP MLD includes three APs, i.e., AP1, AP2 and AP3, and the non-AP MLD includes three non-AP STAs, i.e., STA1, STA2 and STA3. As shown in FIG. 3, the method 300 includes the following steps:

Step 301, STA1 sends a first Multi-link Association Request to AP1 to request for setting up a plurality of links between the AP MLD and the non-AP MLD. In this embodiment, the plurality of links between the AP MLD and the non-AP MLD include Link 1 between AP1 and STA1, Link 2 between AP2 and STA2, and Link 3 between AP3 and STA3.

Step 302, AP1 sends a first Multi-link Association Response to AP1 after receiving the first Multi-link Association Request to set up Link 1, Link 2 and Link 3.

Step 303, All TIDs are mapped to all of the links set up between the AP MLD and the non-AP MLD, i.e., Link 1, Link 2 and Link 3.

The steps 301 and 302 are conducted to set up the link1 between AP1 and STA1, the link 2 between AP2 and STA2, and the link 3 between AP3 and STA3. This is the multi-link setup process in this embodiment. Although in this embodiment, AP1 and STA1 are used to conduct the multi-link setup process, it is to be appreciated by a person skilled in the art that AP2 and STA2, or AP3 and STA3 may also be used to conduct the multi-link setup process in other embodiments. In this embodiment, the TID-to-Link mapping is a default process which is conducted after the multi-link setup process. In this default process, all TIDs including the at least one TID for latency sensitive traffic are mapped to all of the links, i.e., Link 1, Link 2 and Link 3 in this embodiment, set up between the AP MLD and the non-AP MLD.

Step 304, STA1 sends a R-TWT request to AP1 to request for setting up R-TWT agreements on all of the links set up between the AP MLD and the non-AP MLD.

Step 305, AP1 sends a R-TWT response to STA1 after receiving the R-TWT request from STA1 to set up the R-TWT agreements on all of the links set up between the AP MLD and the non-AP MLD.

Step 306, R-TWT agreements are set up on all of the links set up between the AP MLD and the non-AP MLD, i.e., Link 1, Link 2 and Link 3 in this embodiment.

It should be noted that although in this embodiment, the R-TWT agreements are set up on all the links set up between the AP MLD and the non-AP MLD, in other embodiments, the R-TWT agreement may be set up on any one or more links set up between the AP MLD and the non-AP MLD.

In the first embodiment, the R-TWT request and/or the R-TWT response may include one or more R-TWT elements which are set to indicate whether R-TWT agreements are set up on all of the links between the AP MLD and the non-AP MLD.

Figure 3B:
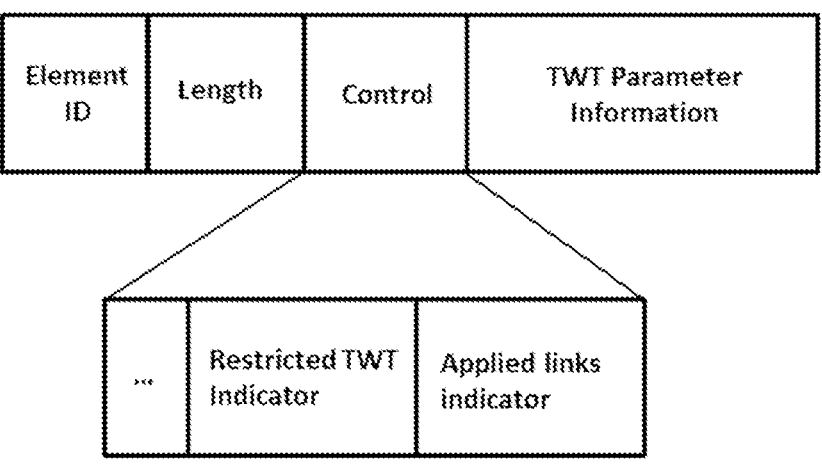
FIG. 3B is a block diagram illustrating a format of the R-TWT element according to some embodiments of the invention.

FIG. 3B is a block diagram illustrating a format of the R-TWT element according to some embodiments of the invention. As shown in FIG. 3B, the control field of the R-TWT element includes a Restricted TWT (R-TWT) Indicator subfield and an Applied links indicator subfield. The R-TWT Indicator subfield is set to indicate whether the information included in the element is used for negotiation of R-TWT parameters. For example, the R-TWT Indicator subfield may be set to 1 to indicate that the information is for R-TWT, or 0 to indicate that the information is not for R-TWT. The applied links indicator subfield may be set to indicate whether the information included in the element is to be applied to all of the links set up between the AP-MLD and the non-AP MLD in this embodiment. Alternatively, the applied links indicator subfield may be set to indicate whether the information included in the element is to be applied to all of the links to which the at least one TIDs for latency sensitive traffic has been mapped. For example, the applied links indicator subfield may be set to 1 to indicate "YES", i.e., the information is to be applied to all of the links to which the at least one TIDs for latency sensitive traffic has been mapped, or 0 to indicate "NO", i.e., the information is not to be applied to all of the links to which the at least one TIDs for latency sensitive traffic has been mapped. It should be noted that the R-TWT Indicator subfield and the Applied links subfield in the control field of the R-TWT element may have different names in other embodiments.

Second Embodiment (Multi-Link Setup with TID-to-Link Mapping Negotiation)

Figure 4:
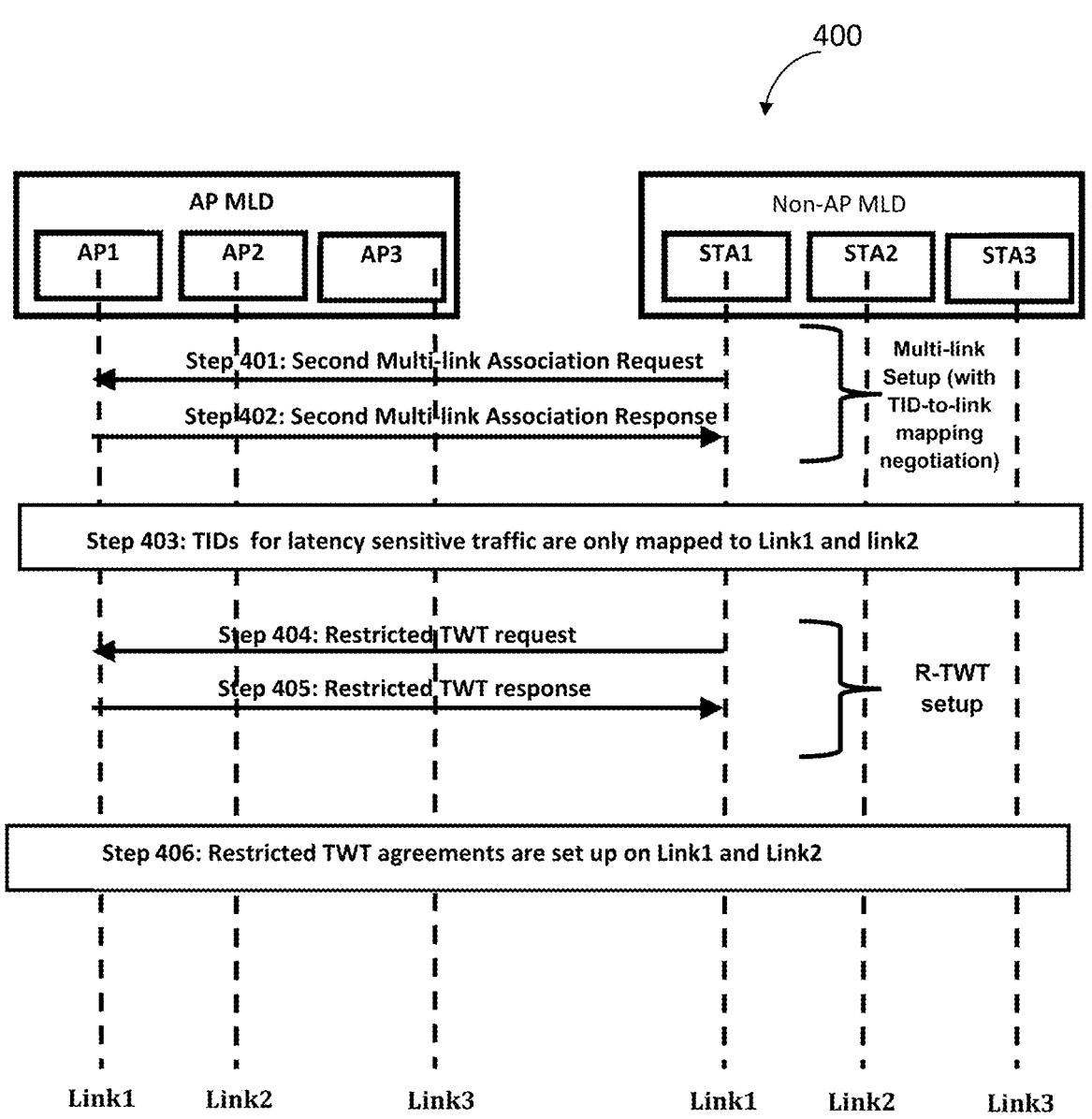
FIG. 4 is a schematic diagram illustrating a method for R-TWT operation for latency sensitive traffic in a WLAN according to a second embodiment of the invention.

FIG. 4 is a schematic diagram illustrating a method 400 for R-TWT operation for latency sensitive traffic in a WLAN according to a second embodiment of the invention. In this embodiment, the AP MLD includes three APs, i.e., AP1, AP2 and AP3, and the non-AP MLD includes three non-AP STAs, i.e., STA1, STA2 and STA3. As shown in FIG. 4, the method 400 includes the following steps:

Step 401, STA1 sends a second Multi-link Association Request to AP1 to request for setting up a plurality of links between the AP MLD and the non-AP MLD. In this embodiment, the plurality of links include Link 1 between AP1 and STA1, Link 2 between AP2 and STA2, and Link 3 between AP3 and STA3.

Step 402, AP1 sends a second Multi-link Association Response to AP1 after receiving the Multi-link Association Request to set up Link 1, Link 2, and Link 3.

Step 403, TIDs for latency sensitive traffic are mapped to Link 1 and Link 2. In this embodiment, there are more than one TID for latency sensitive traffic are mapped to Link 1 and Link 2.

Step 404, STA1 sends a R-TWT request to AP1 to request for setting up R-TWT agreements on Link 1 and Link 2.

Step 405, AP1 sends a R-TWT response to STA1 after receiving the R-TWT request from STA1 to set up the R-TWT agreements on Link 1 and Link 2.

Step 406, R-TWT agreements are set up on Link 1 and Link 2.

In the second embodiment, the steps 401 and 402 are conducted to set up the plurality of links between the AP MLD and non-AP MLD. This multi-link setup process is the same as that in the first embodiment. In this embodiment, the TID-to-Link mapping is a negotiation process conducted with the multi-link setup process. After this negotiation process, the at least one TID for latency sensitive traffic is only mapped to Link 1 and Link 2 among all of the links set up between the AP MLD and the non-AP MLD.

In the second embodiment, the R-TWT agreements are set up on all of the links to which the at least one TID for latency sensitive traffic has been mapped, i.e., Link 1 and Link 2. It should be noted that in other embodiments, the R-TWT agreement may be only mapped to Link 1 or Link 2.

In the second embodiment, the R-TWT request and/or the R-TWT response may include one or more R-TWT elements which are set to indicate whether R-TWT agreements are set up on all of the links to which the at least one TID for latency sensitive traffic has been mapped. The format of the R-TWT element may be as shown in FIG. 3B. The control field of the R-TWT element includes a R-TWT Indicator subfield and an Applied links subfield. The R-TWT Indicator subfield is set to indicate whether the information included in the element is used for negotiation of R-TWT parameters, e.g., the parameters shown in an R-TWT Parameter Set field of an R-TWT element. For example, the R-TWT Indicator subfield may be set to 1 to indicate that the information is for R-TWT, or 0 to indicate that the information is not for R-TWT. The applied links indicator subfield may be set to indicate whether the information included in the element is to be applied to all of the links to which the at least one TIDs for latency sensitive traffic has been mapped. For example, the applied links indicator subfield may be set to 1 to indicate the information is to be applied to all of the links to which the at least one TIDs for latency sensitive traffic has been mapped, or 0 to indicate the information is not to be applied to all of the links to which the at least one TIDs for latency sensitive traffic has been mapped.

Third Embodiment (Separate TID-to-Link Mapping)

Figure 5:
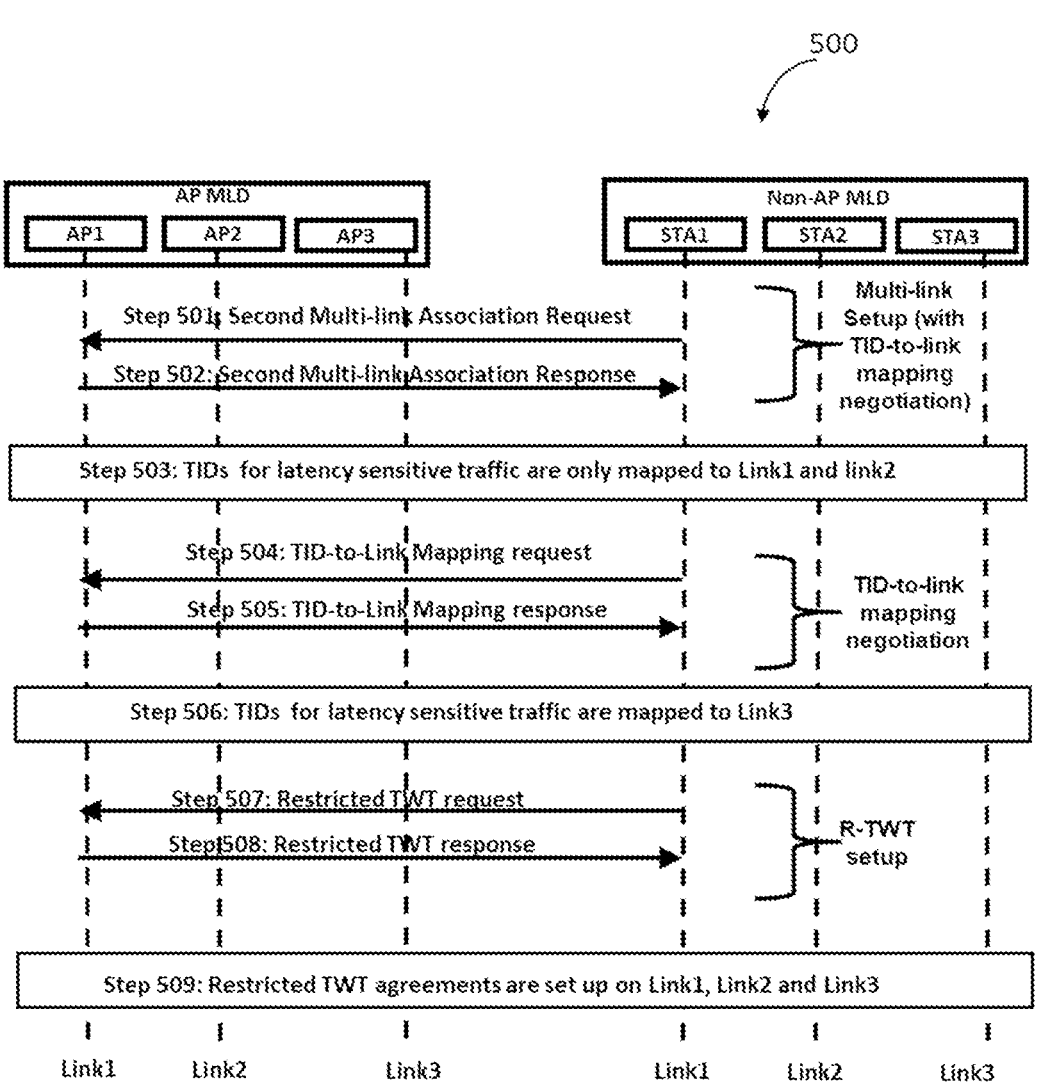
FIG. 5 is a schematic diagram illustrating a method for R-TWT operation for latency sensitive traffic in a WLAN according to a third embodiment of the invention.

FIG. 5 is a schematic diagram illustrating a method 500 for R-TWT operation for latency sensitive traffic in a WLAN according to a third embodiment of the invention. In this embodiment, the AP MLD includes three APs, i.e., AP1, AP2 and AP3, and the non-AP MLD includes three non-AP STAs, i.e., STA1, STA2 and STA3. As shown in FIG. 5, the method 500 includes the following steps:

Steps 501 to 503 are same as Steps 401 to 403 respectively. It will not be repeated here.

Step 504, STA1 sends a TID-to-Link Mapping request to STA1 to request for mapping the at least one TID for latency sensitive traffic to Link 3.

Step 505, AP1 sends a TID-to-Link Mapping response to STA1 after receiving the TID-to-Link Mapping request to map the at least one TID for latency sensitive traffic to Link 3.

Step 506, TIDs for latency sensitive traffic are mapped to Link 3. It should be noted that in this embodiment, a plurality of TIDs for latency sensitive traffic are mapped to Link 3.

Step 507, STA1 sends a R-TWT request to AP1 to request for setting up R-TWT agreements on all of the links to which the at least one TID for latency sensitive traffic has been mapped. In this embodiment, the links include Link 1, Link 2 and Link 3.

Step 508, AP1 sends a R-TWT response to STA1 after receiving the first R-TWT request from STA1 to set up the R-TWT agreements on Link 1, Link 2 and Link 3.

Step 509, R-TWT agreements are set up on Link 1, Link 2 and Link 3.

In the third embodiment, same as the second embodiment, after the TID-to-Link mapping negotiation, the at least one LL TID is only mapped to Link 1 and Link 2, and no LL TID is mapped to Link 3. However, a TID-to-Link mapping update negotiation is initiated by the STA1 to establish a mapping of the at least one LL TID to Link 3. After mapping the at least one LL TID to Link 3, the R-TWT agreement step process is conducted to set up R-TWT agreements on all of the links to which the at least one LL TID has been mapped.

In the third embodiment, similar to the second embodiment, the R-TWT request and/or the R-TWT response may include one or more R-TWT elements which are set to indicate whether R-TWT agreements are set up on all of the links to which the at least one LL TID has been mapped. The format of the R-TWT element may be as shown in FIG. 3B.

Fourth Embodiment (R-TWT Setup Integrated with TID-to-Link Mapping Negotiation)

Figure 6:
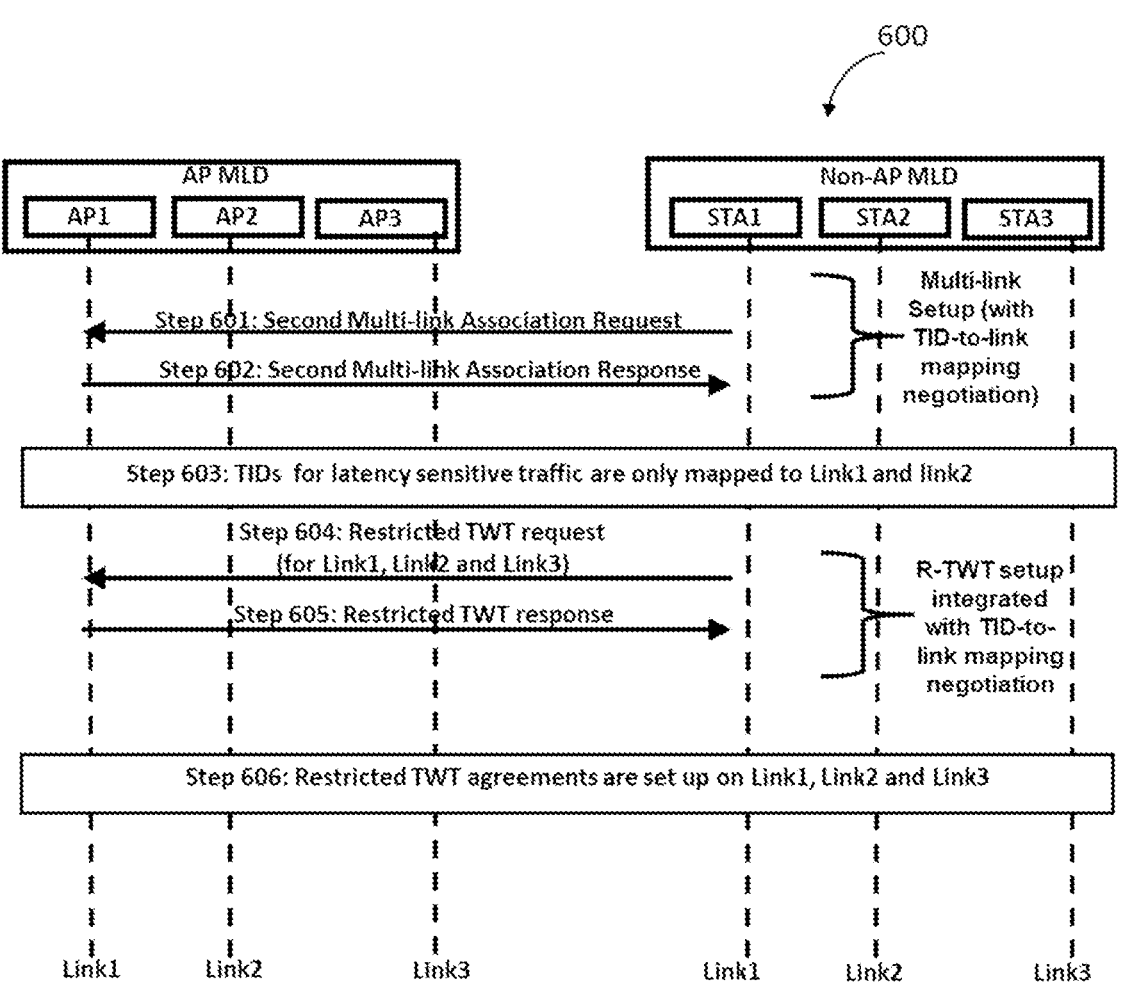
FIG. 6 is a schematic diagram illustrating a method for R-TWT operation for latency sensitive traffic in a WLAN according to a fourth embodiment of the invention.

FIG. 6 is a schematic diagram illustrating a method 600 for R-TWT operation for latency sensitive traffic in a WLAN according to a fourth embodiment of the invention. In this embodiment, the AP MLD includes three APs, i.e., AP1, AP2 and AP3, and the non-AP MLD includes three non-AP STAs, i.e., STA1, STA2 and STA3. As shown in FIG. 5, the method 600 includes the following steps:

Steps 601 to 603 are same as Steps 401 to 403 respectively. It will not be repeated here. In this embodiment, Link,1, Link 2 and Link 3 are set up during the multi-link setup process and the at least one LL TID is only mapped to Link 1 and Link 2 through a TID-to-Link mapping negotiation. No LL TID has been mapped to Link 3.

Step 604, STA1 sends an integrated R-TWT request to AP1 to request for mapping the at least one LL TID to Link 3 and setting up R-TWT agreements on Link 1, Link 2 and Link 3.

Step 605, AP1 sends an integrated R-TWT response to STA1 after receiving the integrated R-TWT request from STA1 to map the TIDs for latency sensitive traffic to Link 3 and set up the R-TWT agreements on Link 1, Link 2 and Link 3.

Step 606, R-TWT agreements are set up on Link 1, Link 2 and Link 3.

In this embodiment, different from the embodiments mentioned above, the TID-to-Link mapping negotiation for Link 3 is integrated with the R-TWT agreement setup process. To conduct the TID-to-Link mapping negotiation together with the R-TWT agreement setup process, the integrated R-TWT request and the integrated R-TWT response may be set to include one or more R-TWT elements and TID-to-Link mapping elements. Alternatively, the integrated R-TWT request and integrated R-TWT response may be set to include one or more R-TWT elements, wherein each R-TWT element is set to include one or more TID-to-Link mapping subfields.

In one example, the integrated R-TWT request may be set to include an R-TWT element which is set to not only indicate the links on which R-TWT agreements are to be set up, but also the links to which the TIDs for latency sensitive traffic are to be mapped. After receiving the integrated R-TWT request, AP1 decides whether to set up the requested TID-to-Link mapping for Link 3 and whether to set up R-TWT agreements on the requested links, i.e., Link 1, Link 2, and Link 3 in this embodiment, and sends the integrated R-TWT response to STA1. The integrated R-TWT response may be set to include an R-TWT element which is set to indicate the links to which the TIDs for latency sensitive traffic have been mapped and the R-TWT agreements have been set up, e.g., with a value of Accept TWT.

FIG. 7A is a block diagram illustrating a first format of a Broadcast R-TWT Parameter Set field of an R-TWT element with TID-to-Link mapping information according to some embodiments of the invention. As shown in FIG. 7A, the Broadcast R-TWT Parameter Set field is set to include a Link ID Bitmap subfield, a Link Mapping of a TID for downlink direction subfield and a Link Mapping of a TID for uplink direction subfield.

The Link ID Bitmap subfield is set to indicate the at least one link to which the R-TWT element is applied. Each bit position of the Link Bitmap subfield corresponds to a link ID which is associated with a link. Each bit position may be set to indicate whether the R-TWT elements is applied to the associated link. For example, a bit position m of the Link Bitmap subfield corresponds to a link ID m. The bit position m may be set to "1" to indicate that the R-TWT element is applied to the link associated with the link ID m, or set to "0" to indicate that the R-TWT element is not applied to the link associated with the link ID m. If the Link ID Bitmap subfield is not present in the broadcast R-TWT Parameter field, the link to which the R-TWT element is applied is the link on which the R-TWT element is transmitted.

The Link Mapping of a TID, e.g., TID i, for downlink direction subfield may be set to indicate the at least one link on which frames belonging to the TID i of latency sensitive traffic for the downlink direction are sent. Each bit position of the Link Mapping of TID i for downlink direction subfield may correspond to a link ID associated with a link. For example, a bit position m of the Link Mapping of TID i for downlink direction subfield corresponds to a link ID m. The bit position m may be set to "1" to indicate that the TID i is mapped to the link associated with the link ID m for the downlink direction or set to "0" to indicate that the TID i is not mapped to the link associated with the link ID m for the downlink direction.

The Link Mapping of a TID, e.g., TID i, for uplink direction subfield may be set to indicate the links on which frames belonging to the TID i of latency sensitive traffic for the uplink direction are sent. Each bit position of the Link Mapping of TID i for uplink direction subfield may correspond to a link ID associated with a link. For example, a bit position m of the Link Mapping of TID i for uplink direction subfield corresponds to a link ID m. The bit position m may be set to "1" to indicate that the TID i is mapped to the link associated with the link ID m for the uplink direction or set to "0" to indicate that the TID i is not mapped to the link associated with the link ID m for the uplink direction.

Figure 7B:
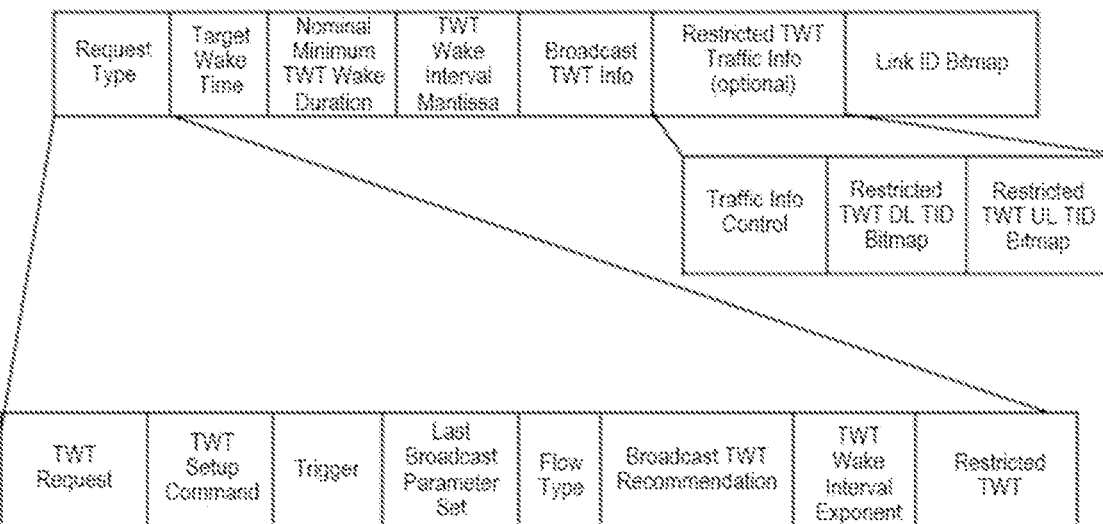
FIG. 7B is a block diagram illustrating a second format of a Broadcast R-TWT Parameter Set field of an R-TWT element with TID-to-Link mapping information according to some embodiments of the invention.

FIG. 7B is a block diagram illustrating a second format of a Broadcast R-TWT Parameter Set field of an R-TWT element with TID-to-Link mapping information according to some embodiments of the invention. As shown in FIG. 7B, in the second format, the Request type field of the Broadcast R-TWT Parameter Set field includes a R-TWT subfield which is set to indicate whether the TWT schedule specified by the corresponding Broadcast TWT Parameter Set field is a R-TWT schedule. For example, the R-TWT subfield may be set to 1 to indicate that the TWT schedule specified by the corresponding Broadcast TWT Parameter Set field is a R-TWT schedule, and set to 0 otherwise. The Broadcast R-TWT Parameter Set field further includes a Link ID Bitmap field and a R-TWT Traffic Info field.

In this example, the Link ID Bitmap is a field of the Broadcast TWT Parameter Set field. Alternatively, in other embodiments of the invention, the Link ID Bitmap may be a subfield of the R-TWT Traffic Info field. The Link ID Bitmap field is set to indicate the at least one link to which the R-TWT element is applied. A value of 1 in bit position m of the Link Bitmap field may indicates that the link associated with the link ID m is the link to which the R-TWT element is applied. A value of 0 in bit position m of the Link Bitmap field may indicate that the link associated with the link ID m is not the link to which the TWT element is applied. If no Link ID Bitmap field exists in the Broadcast TWT Parameter Set field, the link to which the R-TWT element is applied is the link on which the R-TWT element is transmitted.

The R-TWT DL/UL TID Bitmap subfields in the R-TWT Traffic Info field are set to indicate which TID(s) is identified by the TWT scheduling APs or the TWT scheduled STAs as latency sensitive traffic streams in the downlink direction on the links which are indicated in the Link ID Bitmap subfield. The Restricted TWT UL TID Bitmap subfield is set to indicate which TID(s) is identified by the TWT scheduling APs or the TWT scheduled STAs as latency sensitive traffic streams in the uplink direction on the links which are indicated in the Link ID Bitmap subfield. A value of 1 or 0 at bit position k in the bitmap may be set to indicate that TID k is classified as latency sensitive traffic stream and MSDUs of TID k are allowed/disallowed to be transmitted in the R-TWT SP(s) indicated by the TWT element on the links which are indicated in the Link ID Bitmap subfield.

Figure 7C:
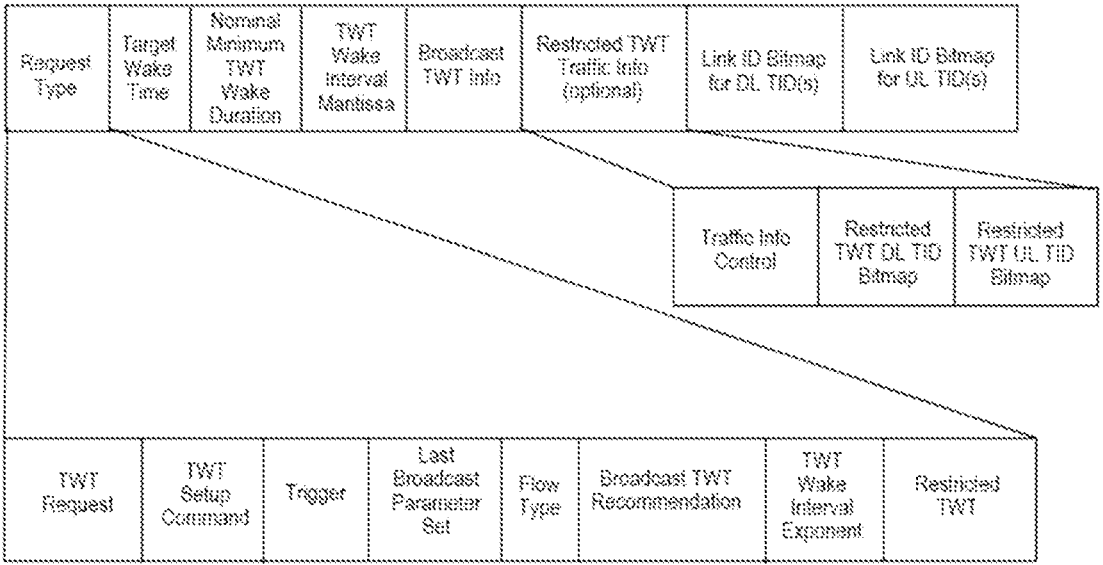
FIG. 7C is a block diagram illustrating a third format of a Broadcast R-TWT Parameter Set field of an R-TWT element with TID-to-Link mapping information according to some embodiments of the invention.

FIG. 7C is a block diagram illustrating a third format of a Broadcast R-TWT Parameter Set field of an R-TWT element with TID-to-Link mapping information according to some embodiments of the invention. As shown in FIG. 7C, in the third format, the Request type field of the Broadcast R-TWT Parameter Set field includes a R-TWT subfield which is same as the R-TWT subfield in the second example as shown in FIG. 7B. The Broadcast R-TWT Parameter Set field further includes a Link ID Bitmap for UL TID field, a Link ID Bitmap for DL TID field and a R-TWT Traffic Info field.

The Link ID Bitmap for DL TID is a field of the Broadcast TWT Parameter Set field as shown in FIG. 7C in this third format. Alternatively, in other embodiments, it may be a subfield of the Restricted TWT Traffic Info field. The Link ID Bitmap for DL TID field is set to indicate the at least one link to which DL TID(s) is mapped. A value of 1 in bit position m of the Link Bitmap for DL TID field may indicate that the link associated with the link ID m is the link to which DL TID(s) is mapped. A value of 0 in bit position m of the Link Bitmap for DL TID field may indicate that the link associated with the link ID m is not the link to which DL TID(s) is mapped.

Similarly, the Link ID Bitmap for UL TID is a field of the Broadcast TWT Parameter Set field as shown in FIG. 3C in this third format. Alternatively, it may be a subfield of the Restricted TWT Traffic Info field in other embodiments. The Link ID Bitmap for UL TID field may be set to indicate the at least one link to which UL TID(s) is mapped. A value of 1 in bit position m of the Link Bitmap for UL TID field may indicate that the link associated with the link ID m is the link to which UL TID(s) is mapped. A value of 0 in bit position m of the Link Bitmap for UL TID field may indicate that the link associated with the link ID m is not the link to which UL TID(s) is mapped.

The R-TWT DL TID Bitmap subfield in the R-TWT Traffic Info field may be set to indicate which TID(s) is identified by the TWT scheduling APs or the TWT scheduled STAs as latency sensitive traffic streams in the downlink direction on the links which are indicated in the Link ID Bitmap for the DL TID field. A value of 1 or 0 at bit position k in the bitmap may indicate that TID k is classified as latency sensitive traffic stream and MSDUs of TID k are allowed or disallowed to be transmitted in the restricted TWT SP(s) specified by the TWT element on the links which are indicated in the Link ID Bitmap for DL TID field.

The R-TWT UL TID Bitmap subfield in the R-TWT Traffic Info field may be set to indicate which TID(s) is identified by the TWT scheduling APs or the TWT scheduled STAs as latency sensitive traffic streams in the uplink direction on the links which are indicated in the Link ID Bitmap for UL TID subfield. A value of 1 or 0 at bit position k in the bitmap may indicate that TID k is classified as latency sensitive traffic stream and MSDUs of TID k are allowed or disallowed to be transmitted in the restricted TWT SP(s) specified by the TWT element on the links which are indicated in the Link ID Bitmap for UL TID field.

A person skilled in the art would understand that in other embodiments of the invention, the requested TID-to-Link mapping may not be set up if this request is not accepted by AP1, and accordingly the R-TWT agreements may only be set up on one or more of the requested links according to the decision of AP1.

Figure 8A:
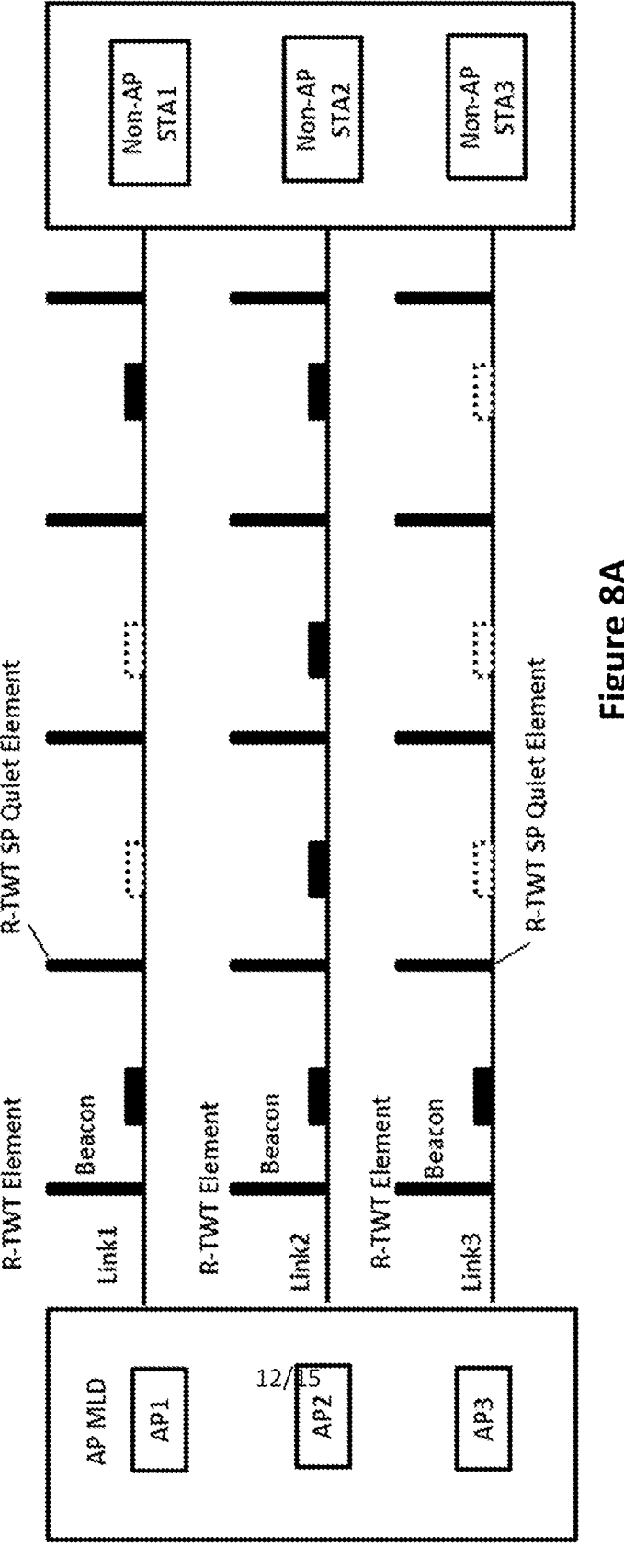
FIG. 8A is a schematic diagram illustrating an R-TWT operation with quiet elements after the R-TWT agreements have been set up on a plurality of links according to one embodiment of the invention.
Figure 8B:
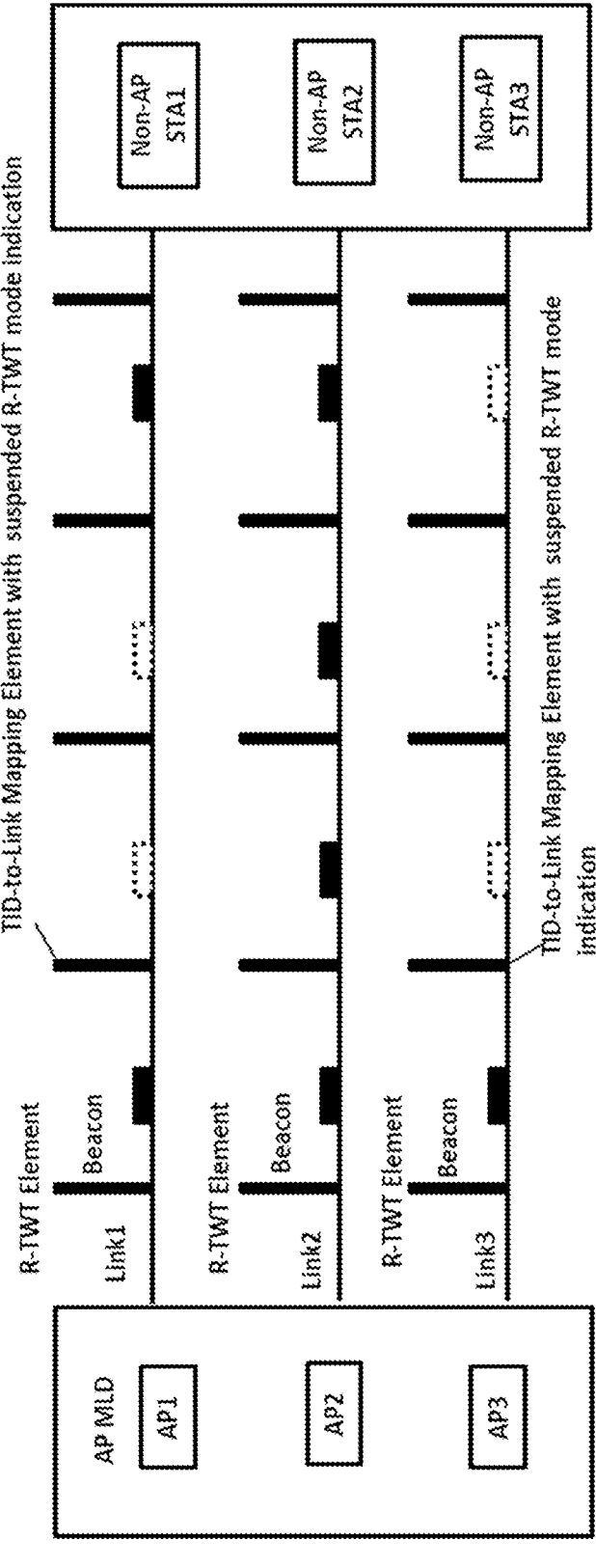
FIG. 8B is a schematic diagram illustrating an R-TWT operation with TID-to-Link Mapping element indicating suspended R-TWT operation mode after the R-TWT agreements have been set up on a plurality of links according to one embodiment of the invention.
Figure 8C:
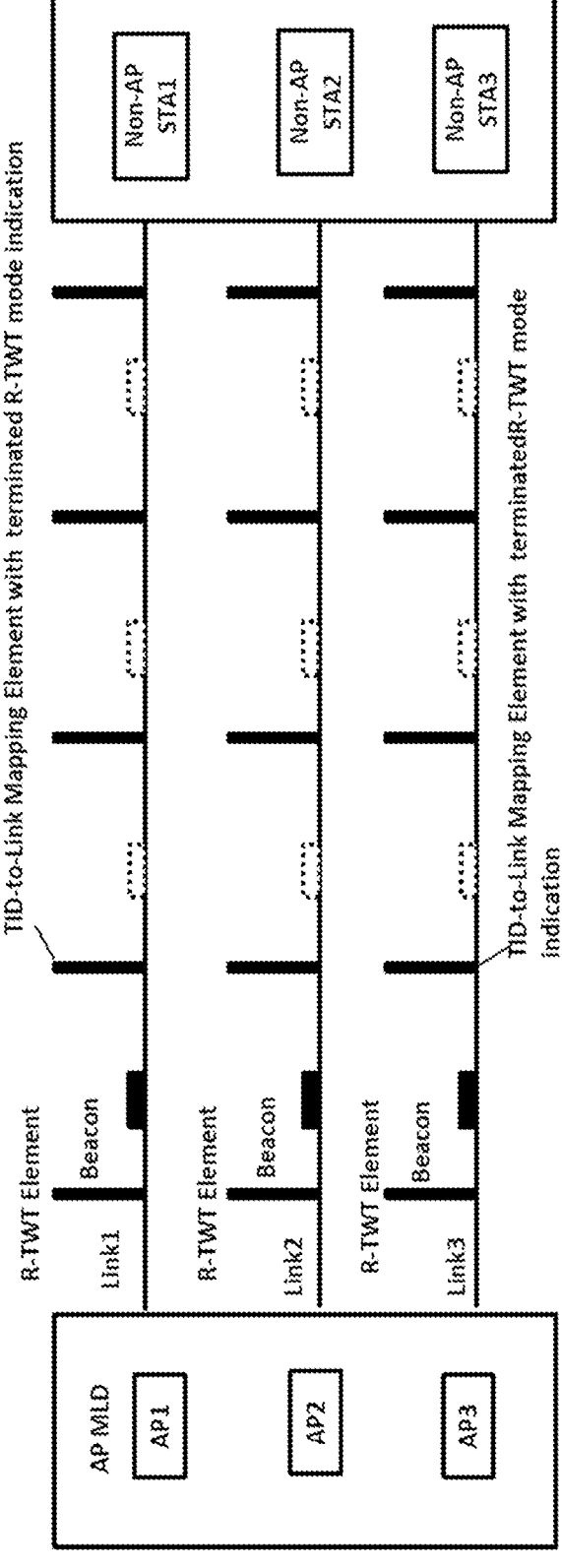
FIG. 8C is a schematic diagram illustrating an R-TWT operation with TID-to-Link Mapping element indicating terminated R-TWT operation mode after the R-TWT agreements have been set up on a plurality of links according to one embodiment of the invention.

After the R-TWT agreements are successfully set up on at least one link between the AP MLD and the non-AP MLD, it may be found that no LL TID is mapped to one or more links on which the R-TWT agreements have been set up due to TID-to-Link mapping update/change in some embodiments of the invention. FIGS. 8A to 8C illustrate three possible ways to conduct the R-TWT operation in these scenarios according to some embodiments of the invention.

R-TWT SP Quiet Element

FIG. 8A is a schematic diagram illustrating an R-TWT operation with quiet elements after the R-TWT agreements have been set up on a plurality of links according to one embodiment of the invention. In this embodiment, the AP MLD and the non-AP MLD do not support a suspended R-TWT operation mode. In this embodiment, AP1, AP2 and AP3 in the AP MLD are EHT APs, while the non-AP STAs in the non-AP MLD may be EHT STAs or pre-EHT STAs.

Referring to FIG. 8A, R-TWT agreements have been set up on the three links, i.e., Link 1, Link 2 and Link 3, between the AP MLD and the non-AP MLD. When no LL TID is mapped to Link 1 due to TID-to-Link mapping update/change, AP1 sends/broadcasts an R-TWT SP Quiet Element on Link 1 to announce an R-TWT SP quiet interval. During the R-TWT SP quiet interval, the R-TWT SPs will be ignored. As shown in FIG. 8A, two R-TWT SP Quiet Elements are sent on Link 1. Similarly, no LL TID is mapped to Link 3 due to TID-to-Link mapping update in this embodiment, three R-TWT SP Quiet Elements are sent on Link 3 by AP3. The R-TWT SP Quiet Elements may be included in management (MGMT) frames sent from AP1/AP3 to STA 1/STA3. STA1 and STA3 receive the R-TWT SP Quiet Elements and will ignore the R-TWT SPs that overlap with the R-TWT SP quiet intervals. Further, if a time duration of the R-TWT quiet intervals on a link exceeds a predetermined threshold, the R-TWT agreement on this link may be torn down.

Suspended R-TWT Operation Mode

FIG. 8B is a schematic diagram illustrating an R-TWT operation with TID-to-Link Mapping element indicating suspended R-TWT mode after the R-TWT agreements have been set up on a plurality of links according to one embodiment of the invention. In this embodiment, the AP MLD and the non-AP MLD support the suspended R-TWT operation mode. In this embodiment, AP1, AP2 and AP3 in the AP MLD are EHT APs, while the non-AP STAs in the non-AP MLD may be EHT STAs or pre-EHT STAs.

Referring to FIG. 8B, R-TWT agreements have been set up on the three links, i.e., Link 1, Link 2 and Link 3, between the AP MLD and the non-AP MLD. When no LL TID is mapped to Link 1 due to TID-to-Link mapping update/ change, AP1 sends/broadcasts a TID-to-Link Mapping element with suspended R-TWT mode indication on Link 1 to announce the updated TIDs mapped to Link 1. The TID-to-Link Mapping element with suspended R-TWT mode indication may be included in an MGMT frame transmitted from AP1 on Link 1 to STA1. In this embodiment, there are two TID-to-Link Mapping elements transmitted on Link 1. Similarly, there is also no LL TID mapped to Link 3 due to TID-to-Link mapping update in this embodiment, three TID-to-Link Mapping elements are sent on Link 3 by AP3.

Once STA1 and STA3 receive the TID-to-Link Mapping elements with suspended R-TWT mode indication on Link 1 and Link 3 respectively, the R-TWT SPs will be ignored during the effective time intervals of the updated TID-to-Link mapping indicated in the TID-to-Link Mapping elements. Further, if a time duration of the updated TID-to-Link mapping indicated in the TID-to-Link Mapping elements on a link exceeds a predetermined threshold, the R-TWT agreement on this link may be torn down.

Terminated R-TWT Operation Mode

FIG. 8C is a schematic diagram illustrating an R-TWT operation with TID-to-Link Mapping element indicating terminated R-TWT operation mode after the R-TWT agreements have been set up on a plurality of links according to one embodiment of the invention. In this embodiment, the AP MLD and the non-AP MLD support the suspended R-TWT operation mode. In this embodiment, AP1, AP2 and AP3 in the AP MLD are EHT APs, while the non-AP STAs in the non-AP MLD may be EHT STAs or pre-EHT STAs.

Referring to FIG. 8C, R-TWT agreements have been set up on the three links, i.e., Link 1, Link 2 and Link 3, between the AP MLD and the non-AP MLD. When no LL TID is mapped to all of Link 1, Link 2 and Link 3 due to TID-to-Link mapping update/change, each AP in the AP MLD sends a TID-to-Link Mapping element with terminated R-TWT mode indication on the corresponding link to announce the updated TIDs mapped to the corresponding link. The TID-to-Link Mapping element may be included in an MGMT frame transmitted from AP to STA on the corresponding link.

Once each STA in the non-AP MLD receives the TID-to-Link Mapping elements on the corresponding link, the R-TWT SPs will be ignored during the effective time intervals of the updated TID-to-Link mapping indicated in the TID-to-Link Mapping elements. Further, if a time duration of the updated TID-to-Link mapping indicated in the TID-to-Link Mapping elements on a link exceeds a predetermined threshold, the R-TWT agreement on this link may be torn down.

Figure 9:
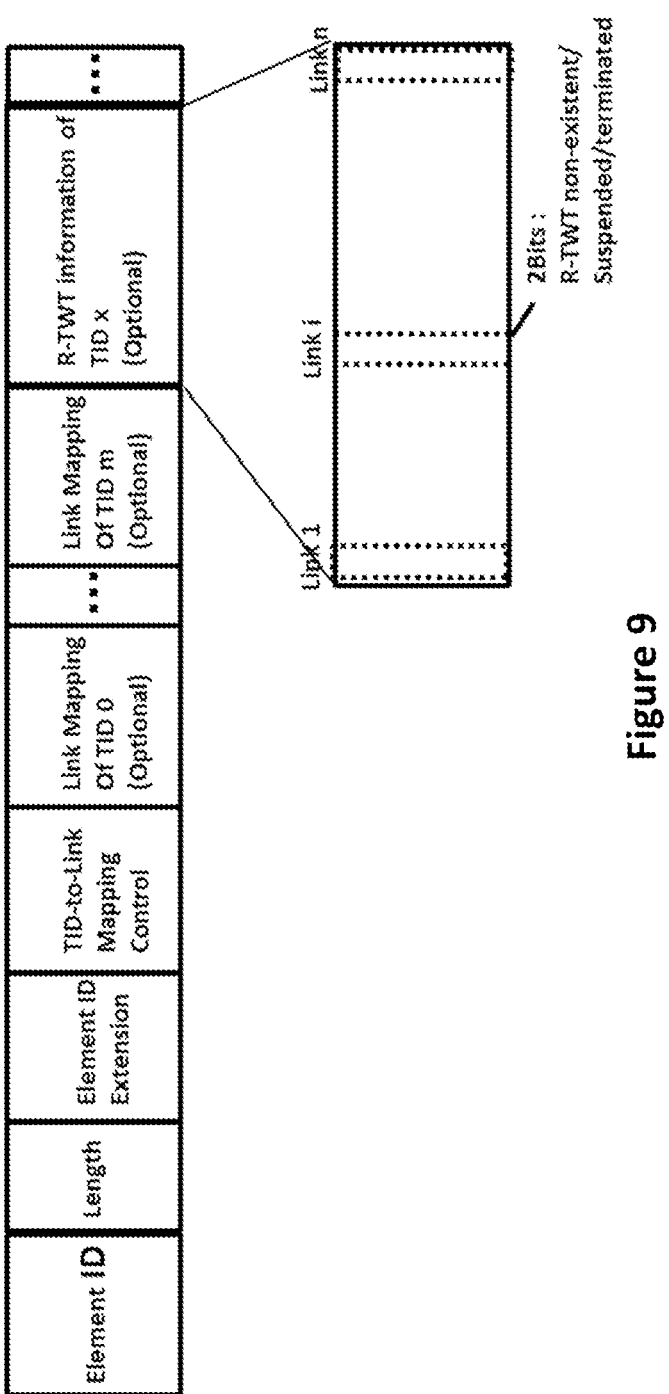
FIG. 9 is a block diagram illustrating a format of a TID-to-Link mapping element with R-TWT information of TID x field according to some embodiments of the invention.

FIG. 9 is a block diagram illustrating a format of a TID-to-Link mapping element with R-TWT information of TID x field according to some embodiments of the invention. The format shown in FIG. 9 may be used in the embodiments in FIGS. 8B and 8C. Referring to FIG. 9, the TID-to-Link Mapping Element is set to include an R-TWT information of TID x field. The R-TWT information of TID x field is set to indicate whether any LL TID is mapped to the links set up between the AP MLD and the non-AP MLD, and whether the R-TWT is allowed in these links. Each link is assigned two bits to indicate a state of the R-TWT operation on the link. For example, the 2 bits assigned to a link may be set to "11" to indicate that the R-TWT operation is terminated on the link, or "10" to indicate that the R-TWT operation is suspended on the link, or "00" to indicate that no R-TWT agreement has been set up on the link.

In the embodiments above as shown in FIGS. 8A to 8C, the R-TWT Element, R-TWT SP Quiet Element, TID-to-Link Mapping Element with suspended R-TWT mode indication, and TID-to-Link Mapping Element with termination R-TWT mode indication may be broadcast elements on the links set up between the AP MLD and non-AP MLD. However, in other embodiments, these elements may not be broadcast ones.

Figure 10:
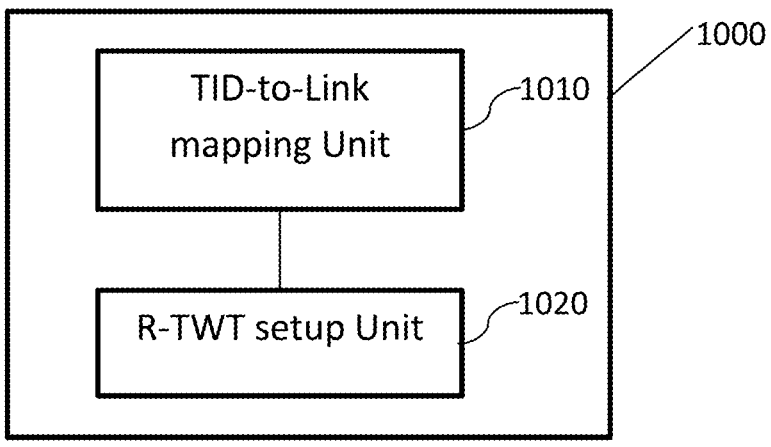
FIG. 10 is a schematic diagram illustrating an AP according to some embodiments of the invention.

Various embodiments of the invention also provide an AP for R-TWT operation for latency sensitive traffic in a WLAN. FIG. 10 is a schematic diagram illustrating an AP 1000 according to some embodiments of the invention. Referring to FIG. 10, the AP 1000 may include a TID-to-Link mapping unit 1010 and a R-TWT setup unit 1020. The TID-to-Link mapping unit 1010 may be configured to send a first response to a first STA in a non-AP MLD to map at least one TID for latency sensitive traffic to at least one link set up between an AP MLD and the non-AP MLD, wherein the AP MLD comprises a plurality of APs including the AP, and the non-AP MLD comprises a plurality of non-AP STAs including the first STA. The R-TWT setup unit 1020 may be configured to send a R-TWT response to the first STA to set up R-TWT agreement on any one or more of the at least one link to which the at least one TID for latency sensitive traffic has been mapped.

In some embodiments, the TID-to-Link mapping unit may be further configured to receive a first request from the first STA. That is to say, the first response from the first AP may be an unsolicited response or a solicited response.

In some embodiments, the TID-to-Link mapping unit 1010 may include a first reception unit configured to receive a first Multi-link Association request from the first STA, and a first transmission unit 1 configured to send a first Multi-link Association response to the first STA to set up a plurality of links between the APs in the AP-MLD and the STAs in the non-AP MLD and map all TIDs to all of the plurality of links set up between the AP MLD and the non-AP MLD by default, wherein all TIDs include the at least one TID for latency sensitive traffic.

Alternatively, in some embodiments, the TID-to-Link mapping unit 1010 may include a second reception unit configured to receive a second Multi-link Association request from the first STA, and a second transmission unit configured to send a second Multi-link Association response to the first STA to set up a plurality of links between the APs in the AP-MLD and the STAs in the non-AP MLD and map at least one TID for latency sensitive traffic to a subset of the links set up between the AP-MLD and the non-AP MLD through a negotiation process with the first STA.

In some embodiments, the TID-to-Link mapping unit 1010 may be further configured to receive a TID-to-Link Mapping request from the first STA in the non-AP MLD, and send a TID-to-Link Mapping response to the first STA to map the at least one TID for latency sensitive traffic to a link between the AP-MLD and the non-AP MLD to which the at least one TID for latency sensitive traffic has not been mapped.

In some embodiments, the R-TWT setup unit may be further configured to receive an R-TWT request from the first STA before sending the R-TWT response to the first STA. That is to say, the R-TWT agreement may be set up by an unsolicited R-TWT response from the first AP or a solicited R-TWT response from the first AP.

In some embodiments, the R-TWT request and/or the R-TWT response may include an R-TWT element including a first subfield and a second subfield in a Control field, wherein the first subfield is set to indicate whether information included in the R-TWT element is for negotiation of parameters of R-TWT, and the second subfield is set to indicate whether the information included in the R-TWT element is applied to all links to which the at least one TID for latency sensitive traffic has been mapped.

In some embodiments, the R-TWT setup unit 1020 may be further configured to receive an integrated R-TWT request from the first STA and send an integrated R-TWT response to the first STA to map the at least one TID for latency sensitive traffic to at least one link between the AP-MLD and the non-AP MLD to which the at least one TID for latency sensitive traffic has not been mapped and set up the R-TWT agreement on any one or more of the at least one link to which the at least one TID for latency sensitive traffic has been mapped.

In some embodiments, the integrated R-TWT request and/or the integrated R-TWT response may be set to include at least one first R-TWT element indicating the at least one link on which the R-TWT agreement is set up and at least one TID-to-Link mapping element indicating the at least one link to which the at least one TID for latency sensitive traffic is mapped. Alternatively, in some embodiments, the integrated R-TWT request and/or the integrated R-TWT response may be set to include at least one second R-TWT element indicating the one or more links on which the R-TWT agreement is set up and the at least one link to which the at least one TID for latency sensitive traffic is mapped. Three examples of the format of the Broadcast TWT Parameter Set field in the R-TWT element are shown in FIGS. 7A to 7C.

In some embodiments, the AP 1000 may further include a first R-TWT termination unit configured to tear down a R-TWT agreement set up on a first link between the AP and the first STA if no TID for latency sensitive traffic is mapped to a first link due to TID-to-Link mapping update.

In some embodiments, the AP 1000 may further include a second R-TWT termination unit configured to, if the AP MLD and the non-AP MLD support a suspended R-TWT operation mode, and no TID for latency sensitive traffic is mapped to a first link set up between the AP and the first STA, send a R-TWT SP Quiet Element or a TID-to-Link Mapping Element with a suspended R-TWT mode indication on the first link to enter the first link into a suspended TWT operation mode, or send a TID-to-Link Mapping Element with a R-TWT termination mode indication on the first link to terminate the R-TWT agreement on the first link. In some embodiments, the second R-TWT termination unit 1030B may be further configured to tear down the R-TWT agreement on the first link if a time duration of the suspended R-TWT operation mode exceeds a predetermined threshold value.

In some embodiments, the TID-to-Link mapping Element may include an R-TWT information field for TID which is set to indicate whether the at least one TID for latency sensitive traffic is mapped to a plurality of links set up between the AP MLD and the non-AP MLD and a state of R-TWT operation, wherein the state of R-TWT operation is set to indicate the suspended R-TWT operation mode, or the R-TWT termination mode, or a non-existent R-TWT mode.

Figure 11:
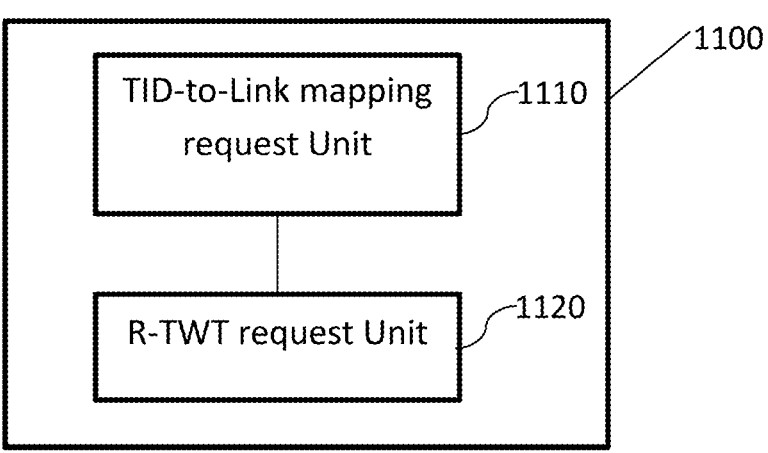
FIG. 11 is a schematic diagram illustrating an STA according to some embodiments of the invention.

Various embodiments of the invention also provide an STA for R-TWT operation for latency sensitive traffic in a WLAN. FIG. 11 is a schematic diagram illustrating an STA 1100 according to some embodiments of the invention.

Referring to FIG. 11, the STA 1100 may include a TID-to-Link mapping request unit 1110 and an R-TWT request unit 1120. The TID-to-Link mapping request unit 1110 may be configured to receive a first response from a first AP in an AP MLD to map at least one TID for latency sensitive traffic to at least one link set up between the AP MLD and a non-AP MLD, wherein the AP MLD comprises a plurality of APs including the first AP and the non-AP MLD comprises a plurality of non-AP STAs including the STA. The R-TWT request unit 1120 may be configured to receive a R-TWT response from the first AP to set up R-TWT agreement on any one or more of the at least one link to which the at least one TID for latency sensitive traffic has been mapped.

In some embodiments, the TID-to-Link mapping request unit 1110 may be further configured to send a first request to the first AP. That is to say, the first response from the first AP may be an unsolicited response or a solicited response.

In some embodiments, the TID-to-Link mapping request unit 1110 may include a first transmission unit configured to send a first Multi-link Association request to the first AP; and a first reception unit configured to receive a first Multi-link Association response from the first AP to set up a plurality of links between the APs in the AP-MLD and the STAs in the non-AP MLD and map all TIDs to all of the plurality of links set up between the AP MLD and the non-AP MLD by default, wherein all TIDs include the at least one TID for latency sensitive traffic.

Alternatively, in some embodiments, the TID-to-Link mapping request unit 1110 may include a second transmission unit configured to send a second Multi-link Association request to the first AP, and a second reception unit configured to receive a second Multi-link Association response from the first AP to set up a plurality of links between the APs in the AP-MLD and the STAs in the non-AP MLD and map at least one TID for latency sensitive traffic to a subset of the links set up between the AP-MLD and the non-AP MLD through a negotiation process with the first AP.

In some embodiments, the TID-to-Link mapping request unit 1110 may be further configured to send a TID-to-Link Mapping request to the first AP, and receive a TID-to-Link Mapping response from the first AP to map the at least one TID for latency sensitive traffic to a link between the AP-MLD and the non-AP MLD to which the at least one TID for latency sensitive traffic has not been mapped.

In some embodiments, the R-TWT request unit may be further configured to send a R-TWT request to the first AP before receiving the R-TWT response. That is to say, the R-TWT agreement may be set up by an unsolicited R-TWT response from the first AP or a solicited R-TWT response from the first AP.

In some embodiments, the R-TWT request and/or the R-TWT response comprises an R-TWT element including a first subfield and a second subfield in a Control field, wherein the first subfield is set to indicate whether information included in the R-TWT element is for negotiation of parameters of R-TWT, and the second subfield is set to indicate whether the information included in the R-TWT element is applied to all links to which the at least one TID for latency sensitive traffic has been mapped.

In some embodiments, the R-TWT request unit 1120 may be further configured to send an integrated R-TWT request to the first AP and receive an integrated R-TWT response from the first AP to map the at least one TID for latency sensitive traffic to at least one link between the AP-MLD and the non-AP MLD to which the at least one TID for latency sensitive traffic has not been mapped and set up the R-TWT agreement on any one or more of the at least one link to which the at least one TID for latency sensitive traffic has been mapped.

In some embodiments, the integrated R-TWT request and/or the integrated R-TWT response may be set to include at least one first R-TWT element indicating the at least one link on which the R-TWT agreement is set up and at least one TID-to-Link mapping element indicating the at least one link to which the at least one TID for latency sensitive traffic is mapped.

Alternatively, in some embodiments, the integrated R-TWT request and/or the integrated R-TWT response may be set to include at least one second R-TWT element indicating the one or more links on which the R-TWT agreement is set up and the at least one link to which the at least one TID for latency sensitive traffic is mapped. Three examples of the format of the Broadcast TWT Parameter Set field in the R-TWT element are shown in FIGS. 7A to 7C.

In some embodiments, the STA 1100 may further include a first R-TWT termination unit configured to tear down a R-TWT agreement set up on a first link between the first AP and the STA if no TID for latency sensitive traffic is mapped to a first link.

In some embodiments, the STA 1100 may further include a second R-TWT termination unit configured to, if the AP MLD and the non-AP MLD support a suspended R-TWT operation mode, and no TID for latency sensitive traffic is mapped to a first link set up between the first AP and the STA, enter the first link into a suspended TWT operation mode upon receipt of a R-TWT SP Quiet Element or a TID-to-Link Mapping Element with a suspended R-TWT mode indication sent by the first AP on the first link, or terminate the R-TWT agreement on the first link upon receipt of a TID-to-Link Mapping Element with a R-TWT termination indication sent by the first AP on the first link. Preferably, the second R-TWT termination unit may be further configured to tear down the R-TWT agreement on the first link if a time duration of the suspended R-TWT operation mode exceeds a predetermined threshold value.

In some embodiments, the TID-to-Link mapping Element comprises an R-TWT information field for TID which is set to indicate whether the at least one TID for latency sensitive traffic is mapped to a plurality of links set up between the AP MLD and the non-AP MLD and a state of R-TWT operation, wherein the state of R-TWT operation is set to indicate the suspended R-TWT operation mode, or the R-TWT termination mode, or a non-existent R-TWT mode.

Various embodiments of the invention also provide an AP for R-TWT operation for latency sensitive traffic in a WLAN. The AP may include a memory to store instructions for performing the first method for R-TWT operation for latency sensitive traffic in the WLAN, and a processor communicably coupled with the memory, the processor configured to execute the instructions to perform the first method for R-TWT operation for latency sensitive traffic in a WLAN as described in various embodiments of the invention.

Various embodiments of the invention also provide an STA for R-TWT operation for latency sensitive traffic in a WLAN. The STA may include a memory to store instructions for performing the second method for R-TWT operation for latency sensitive traffic in the WLAN, and a processor communicably coupled with the memory, the processor configured to execute the instructions to perform the second method for R-TWT operation for latency sensitive traffic in a WLAN as described in various embodiments of the invention.

Various embodiments of the invention also provide a computer program product comprising instructions to cause a computer to perform any method for R-TWT operation for latency sensitive traffic in a WLAN according to any embodiment of the invention, when executed thereon.

Various embodiments of the invention also provide a computer program comprising instructions to cause a computer to perform a method for R-TWT operation for latency sensitive traffic in a WLAN according to any embodiment of the invention, when executed thereon.

Various embodiments of the invention also provide a non-volatile storage medium comprising computer program codes to cause a computer to perform a method for R-TWT operation for latency sensitive traffic in a WLAN according to any embodiment of the invention, when executed thereon.

Various embodiments of the invention also provide a chip configured to perform a method for R-TWT operation for latency sensitive traffic in a WLAN according to any embodiment of the invention.

At least some steps of the methods for R-TWT operation for latency sensitive traffic in a WLAN according to any embodiments of the invention described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

As described above, various embodiments of the invention provide an effective mechanism for R-TWT operation for latency sensitive traffic in a WLAN to further optimize spectral efficiency, increase throughout and reduce power consumption of the WLAN. With the methods and devices provided in embodiments of the invention, the TID-to-Link mapping may be performed as a default process during or after the multi-link setup process, a negotiation process together with the multi-link setup process, a separate negotiation process after the multi-link setup process, or an integrated negotiation process with the R-TWT setup process, depending on the actual needs of the communication system.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for restricted target wake time (R-TWT) operation for latency sensitive traffic in a wireless local area network (WLAN), the method comprising:

receiving, by a first station (STA) in a non-access point (AP) multi-link device (MLD), a R-TWT response to set up R-TWT agreement on any one or more of at least one link to which at least one Traffic Identifier (TID) for latency sensitive traffic has been mapped, wherein mapping between the at least one TID for latency sensitive traffic and the at least one link is established by receiving, by the first STA, a first response from a first AP in an AP MLD to map the at least one TID for latency sensitive traffic to the at least one link set up between the AP MLD and the non-AP MLD, wherein the AP MLD comprises a plurality of APs and the non-AP MLD comprises a plurality of non-AP STAs, wherein the R-TWT response and the first response are different responses.

2. The method according to claim 1, further comprising: sending, by the first STA, a first request to the first AP.

3. The method according to claim 2, wherein the sending the first request comprises:

sending, by the first STA, a first Multi-link Association request to the first AP, and the receiving the first response comprises:

receiving, by the first STA, a first Multi-link Association response from the first AP to set up a plurality of links between the APs in the AP-MLD and the STAs in the non-AP MLD and map all TIDs to all of the plurality of links set up between the AP MLD and the non-AP MLD by default, wherein all TIDs include the at least one TID for latency sensitive traffic.

4. The method according to claim 2, wherein the sending the first request comprises: sending, by the first STA, a second Multi-link Associate request from the first STA, and the receiving the first response comprises: receiving, by the first STA, a second Multi-link Association response from the first AP to set up a plurality of links between the APs in the AP-MLD and the STAs in the non-AP MLD and map at least one TID for latency sensitive traffic to a subset of the links set up between the AP-MLD and the non-AP MLD through a negotiation process with the first AP.

5. The method according to claim 4, further comprising: sending, by the first STA, a TID-to-Link Mapping request to the first AP; and receiving, by the first STA, a TID-to-Link Mapping response from the first AP to map the at least one TID for latency sensitive traffic to a link between the AP-MLD and the non-AP MLD to which the at least one TID for latency sensitive traffic has not been mapped.

6. The method according to claim 1, further comprising: before receiving the R-TWT response, sending, by the first STA, a R-TWT request to the first AP.

7. The method according to claim 6, wherein the R-TWT request and/or the R-TWT response comprises an R-TWT element including a first subfield and a second subfield in a Control field, wherein the first subfield is set to indicate whether information included in the R-TWT element is for negotiation of parameters of R-TWT, and the second subfield is set to indicate whether the information included in the R-TWT element is applied to all links to which the at least one TID for latency sensitive traffic has been mapped.

8. The method according to claim 6, wherein the sending the R-TWT request comprises:

sending, by the first STA, an integrated R-TWT request to the first AP; and the receiving the R-TWT response comprises:

receiving, by the first STA, an integrated R-TWT response from the first AP to map the at least one TID for latency sensitive traffic to at least one link between the AP-MLD and the non-AP MLD to which the at least one TID for latency sensitive traffic has not been mapped and set up the R-TWT agreement on any one or more of the at least one link to which the at least one TID for latency sensitive traffic has been mapped.

9. The method according to claim 8, wherein the integrated R-TWT request and/or the integrated R-TWT response is set to include at least one first R-TWT element indicating the at least one link on which the R-TWT agreement is set up and at least one TID-to-Link mapping element indicating the at least one link to which the at least one TID for latency sensitive traffic is mapped.

10. The method according to claim 8, wherein the integrated R-TWT request and/or the integrated R-TWT response is set to include at least one second R-TWT element indicating the one or more links on which the R-TWT agreement is set up and the at least one link to which the at least one TID for latency sensitive traffic is mapped.

11. The method according to claim 10, wherein the second R-TWT element comprises a Broadcast R-TWT Parameter Set field which is set to include a first subfield indicating at least one link to which the R-TWT is applied, a second subfield indicating at least one link on which frames belonging to a TID for latency sensitive traffic for downlink direction are sent, and a third subfield indicating at least one link on which frames belonging to a TID for latency sensitive traffic for uplink direction are sent.

12. The method according to claim 10, wherein the second R-TWT element comprises a Broadcast R-TWT Parameter Set field which is set to include a R-TWT Traffic Info field, at least one Link ID Bitmap field and a subfield for R-TWT in a Request Type field.

13. The method according to claim 12, wherein the at least one Link ID Bitmap field includes a Link ID Bitmap for UL TID field and a Link ID Bitmap for DL TID field.

14. An Access Point (AP) for R-TWT operation for latency sensitive traffic in a WLAN, the AP comprising:

a memory configured to store instructions; and a processor communicably coupled with the memory, wherein the processor is configured to execute the instructions stored in the memory to cause the AP to:

send a R-TWT response to a first STA in a non-AP MLD to set up R-TWT agreement on any one or more of at least one link to which at least one TID for latency sensitive traffic has been mapped, wherein mapping between the at least one TID for latency sensitive traffic and the at least one link is established by sending a first response to the first STA to map the at least one TID for latency sensitive traffic to the at least one link set up between an AP MLD and the non-AP MLD, wherein the AP MLD comprises a plurality of APs including the AP, and the non-AP MLD comprises a plurality of non-AP STAs including the first STA.

15. A Station (STA) for R-TWT operation for latency sensitive traffic in a WLAN, the STA comprising:

a memory configured to store instructions; and a processor communicably coupled with the memory, wherein the processor is configured to execute the instructions stored in the memory to cause the STA to:

receive a R-TWT response from a first AP in an AP MLD to set up R-TWT agreement on any one or more of at least one link to which at least one TID for latency sensitive traffic has been mapped, wherein mapping between the at least one TID for latency sensitive traffic and the at least one link is established by receiving a first response from the first AP to map the at least one TID for latency sensitive traffic to the at least one link set up between the AP MLD and a non-AP MLD, wherein the AP MLD comprises a plurality of APs including the first AP and the non-AP MLD comprises a plurality of non-AP STAs including the STA.

16. The STA according to claim 15, wherein the processor is configured to execute the instructions stored in the memory to further cause the STA to send a first request to the first AP.

17. The STA according to claim 16, wherein the processor is configured to execute the instructions stored in the memory to further cause the STA to:

send a first Multi-link Association request to the first AP, and receive a first Multi-link Association response from the first AP to set up a plurality of links between the APs in the AP-MLD and the STAs in the non-AP MLD and map all TIDs to all of the plurality of links set up between the AP MLD and the non-AP MLD by default, wherein all TIDs include the at least one TID for latency sensitive traffic.

18. The STA according to claim 16, wherein the processor is configured to execute the instructions stored in the memory to further cause the STA to:

send a second Multi-link Association request to the first AP, and receive a second Multi-link Association response from the first AP to set up a plurality of links between the APs in the AP-MLD and the STAs in the non-AP MLD and map at least one TID for latency sensitive traffic to a subset of the links set up between the AP-MLD and the non-AP MLD through a negotiation process with the first AP.

19. The STA according to claim 18, wherein the processor is configured to execute the instructions stored in the memory to further cause the STA to send a TID-to-Link Mapping request to the first AP, and receive a TID-to-Link Mapping response from the first AP to map the at least one TID for latency sensitive traffic to a link between the AP-MLD and the non-AP MLD to which the at least one TID for latency sensitive traffic has not been mapped.

20. The STA according to claim 15, wherein the processor is configured to execute the instructions stored in the memory to further cause the STA to send a R-TWT request to the first AP before receiving the R-TWT response.

* * * * *